United States Patent [19]
Bell, Jr.

[11] 3,953,785
[45] Apr. 27, 1976

[54] POWER SUPPLY
[75] Inventor: William Sherman Bell, Jr., Houston, Tex.
[73] Assignee: Telxon Corporation, Houston, Tex.
[22] Filed: Nov. 29, 1974
[21] Appl. No.: 528,439

[52] U.S. Cl.............................. 321/43; 323/DIG. 1
[51] Int. Cl.²......................................... H02M 7/44
[58] Field of Search.................. 323/DIG. 1; 321/43, 321/44

[56] References Cited
UNITED STATES PATENTS

| | | | |
|---|---|---|---|
| 3,305,767 | 2/1967 | Belhl et al. | 323/DIG. 1 |
| 3,320,512 | 5/1967 | Kruger | 323/DIG. 1 |
| 3,377,546 | 4/1968 | Schott | 323/DIG. 1 |
| 3,417,321 | 12/1968 | Clapp | 323/DIG. 1 |
| 3,660,753 | 5/1972 | Judd et al. | 323/DIG. 1 |

Primary Examiner—William M. Shoop
Attorney, Agent, or Firm—Arnold, White & Durkee

[57] ABSTRACT

A novel high voltage power supply is disclosed which generates an unregulated output voltage from a dc input voltage. The magnitude of the unregulated output voltage may exceed the magnitude of the applied dc voltage. This output voltage appears across a capacitor which is in series with an inductor and a switch. The dc voltage is applied across the inductor and switch, and the switch is periodically closed by an oscillator. While the switch is closed, the voltage across the capacitor increases from energy supplied by the dc voltage. When the switch is open, the voltage on the capacitor is further increased by energy that was stored in the inductor while the switch was closed. A sensing circuit controls the opening and closing of the switch. The high voltage power supply is especially adaptable for use with a display of the gas discharge or plasma type.

2 Claims, 26 Drawing Figures

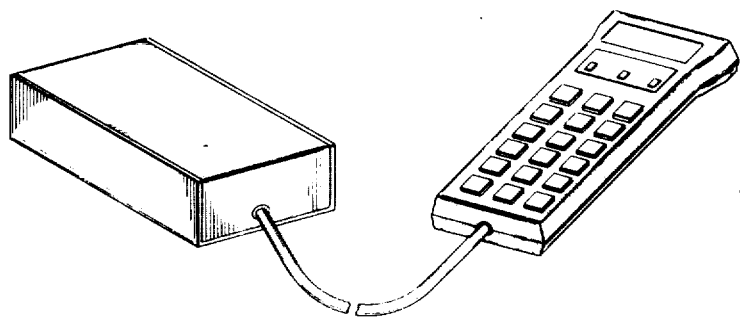
FIG.1
FIG.1A
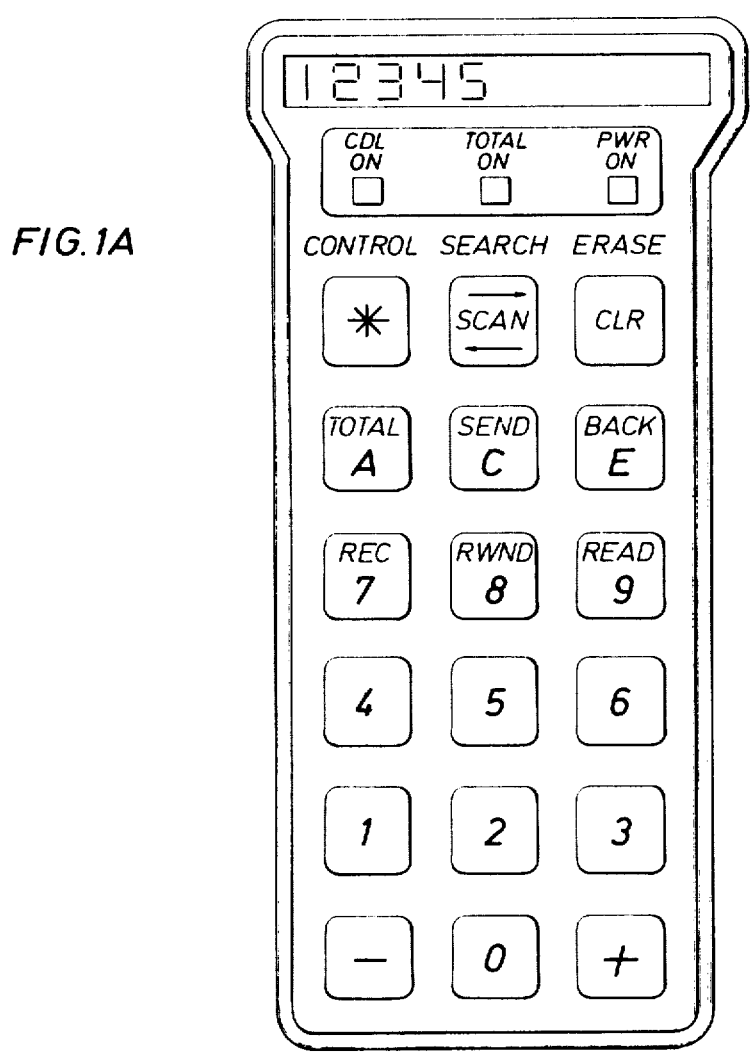

ns.

POWER SUPPLY

BACKGROUND OF THE INVENTION

1. Field of the Invention

The present invention relates to improvements in portable data devices of the type wherein data may be keyed, viewed for accuracy, recorded on magnetic tape, recalled from magnetic tape, and telephonically transmitted for processing.

2. Description of the Prior Art

At the present time there are various types of data collection systems in use for collecting and recording various types of data. Data that is collected by these systems is usually transmitted by conventional means to a central computer for further processing. These data collection systems are especially useful to supermarkets and drug stores as a means of ordering merchandise.

One type of data collection system developed to date generally uses a modified adding machine as an input device to a recording medium. These types of systems are usually cumbersome to use, since carts are required to transport them. Furthermore, these systems require conventional 110 volt electricity for operation, leading to awkward power cords and limited mobility.

Portable data entry devices have been developed to alleviate some of the problems associated with the above devices. These portable devices have not, however, provided total flexibility. Moreover, they have not provided sufficient safeguards against un-noticed operator error, e.g., inadvertent deletion of data, and they have been too complicated for many users to operate correctly and consistently, especially untrained persons.

SUMMARY OF THE INVENTION

The present invention overcomes the shortcomings of the prior art without sacrificing light weight or portability.

The system provides for recording data on a tape cassette in a portable case, which also includes a microcomputer set and batteries. A hand-held keyboard input unit, including a display, is connected by a cable to the case. In one aspect of the invention, circuitry is provided for generating a signal when the battery voltage is below one predetermined level. The signal is inputted to the microcomputer set, which generates a signal sequence to the display, indicating the low-battery condition.

In another aspect of the invention, the batteries are automatically electronically disconnected when battery voltage drops below a second predetermined level. This feature is part of the "data integrity" theme of the invention.

Various components are powered and shut down as functionally required, thereby prolonging battery life.

An important aspect of the present invention is that it permits, upon operator key command, a re-winding of the tape and an automatic search for a signal pattern corresponding to a coded item chosen by the operator, or, if the operator so elects, an item-by-item scan of all previous entries. Additionally, the three previous entries at any given time are stored in memory, and may accordingly be reviewed without moving the tape at all.

BRIEF DESCRIPTION OF THE DRAWINGS

In the accompanying drawings:

FIG. 1 is a perspective view of the portable apparatus of this invention.

FIG. 1(a) is a more detailed view of the keyboard unit 90 of FIG. 1.

DESCRIPTION OF THE PREFERRED EMBODIMENT

Figure 2:
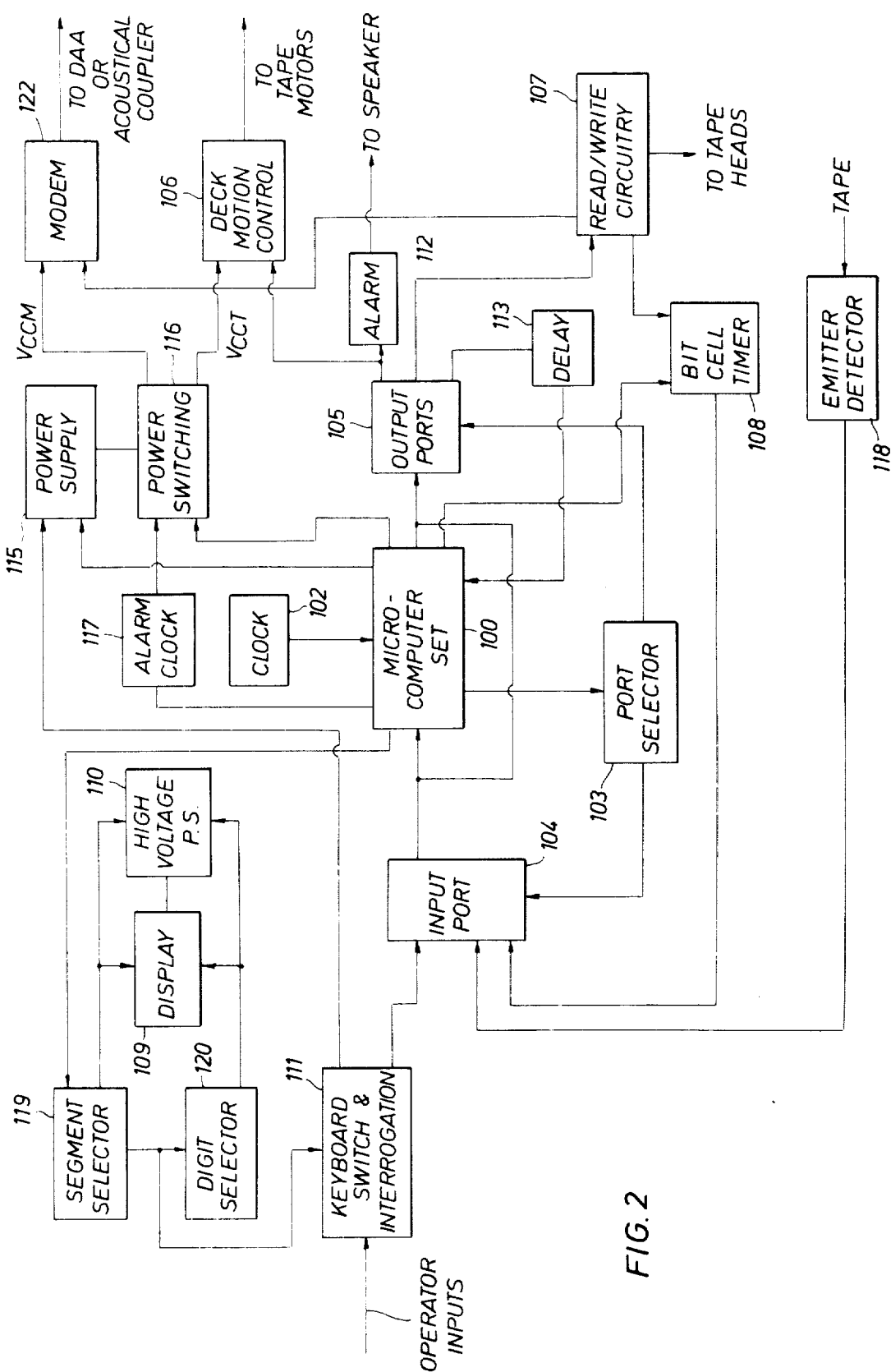
FIG. 2 is a block diagram illustrating the electrical arrangement of the system of this invention.

It will be appreciated that the present invention can take many forms and embodiments. The true essence and spirit of this invention are defined in the appended claims, and it is not intended that the embodiment of the invention presented herein should limit the scope thereof.

Referring now to FIG. 1, the external configuration of the portable data entry apparatus of this invention is shown. This apparatus is comprised of a keyboard input-display unit 90, a housing 91 in which a tape deck mechanism and a majority of the electronics embodying this invention are located and into which a magnetic cassette tape cartride 94 may be inserted, and the cable 92 which connects housing 91 and keyboard-display unit 90. A specific function, e.g., the entry of data, to be performed by the portable data entry apparatus is selected by the operator. This is accomplished by utilization of the keyboard input-display unit 90. The electronics which reside in housing 91 detect the function to be performed, and, in the case of data entry, generate proper electrical signals to cause the data to be written on the tape in the tape cartridge 94. Also the electronics position the tape such that it is ready to accept new data.

Referring now to FIG. 2, there is shown a block diagram of the portable data entry apparatus of this invention. It is comprised of microcomputer set 100, clock 102, port selector 103, input port 104, output port 105, deck motion control 106, read-write circuitry 107, bit cell timer 108, display 109, high voltage power supply 110, keyboard switch and interrogation assembly 111, alarm 112, delay 113, modem 114, power supply 115, power switching 116, alarm clock 117, emitter detector 118, segment selector 119, digit selector 120, and modem 121. It will be appreciated that the block diagram is presented to give a general understanding of interrelation of the above interrelated elements. It should also be appreciated that the detailed interconnection of the various devices is not given at this point for ease of presentation of the block diagram. The detailed interconnection of these devices will be set forth later in the specification.

Figure 19:
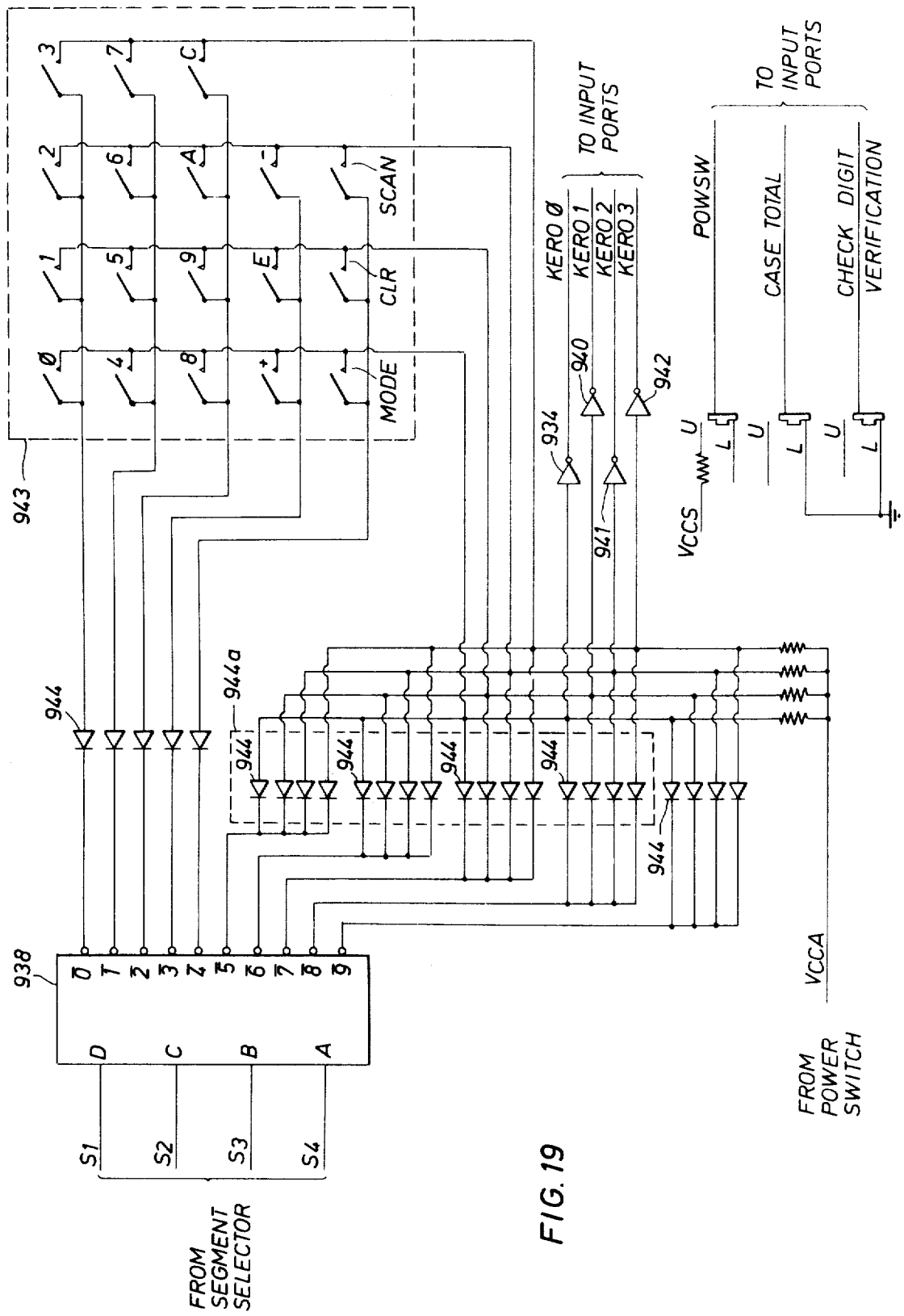
FIG. 19 is a schematic diagram of the keyboard switch and interrogation circuitry of the system of FIG. 2.

The operation of the apparatus of this invention begins, with reference to FIG. 2, by assuming that no previous data have been recorded on tape and that the operator is just beginning to use the apparatus. Tape cartridge 94, is, therefore, inserted in the housing 91, and the power switch on. Keyboard input-display unit 90 is engaged in the "on" position. This switch is schematically shown in FIG. 19, and its being engaged "on" causes power supply 115 to be activated.

Since the source of power for the portable data entry apparatus of this invention is batteries, it is desirable to minimize the consumption of battery power. Power switching unit 116 (FIG. 2) accomplishes this by supplying power to certain component parts only when power to those parts is required for proper operation. For example, power is supplied to the modem 121 only when the operator puts the unit in the "send" mode as described below, and power is supplied to the tape deck only when the operator puts the unit in either the SEND or RECORD modes.

Furthermore, battery power is conserved when in other modes by switching the power to certain component parts of the apparatus at periodic intervals. The length of time that power is available to these components is referred to as the "awake" time, and the length of time that it is not available is referred to as the "asleep" time. In the preferred embodiment of this invention the maximum "awake" time is approximately 2.5 milliseconds, and the "asleep" time is approximately 7.5 milliseconds.

Power supply 115, when activated, supplies power directly to the microcomputer set 100, and the microcomputer set 100 begins to execute a series of predetermined instructions, as later illustrated. Since at this point in the operation only the power switch has been turned on, the microcomputer set 100 is interrogating the keyboard switch (FIG. 19) and interrogation circuitry 111 via the segment selector circuitry 119 to determine if a mode has been selected by the operator. Since no previous data has been recorded on tape and the operator was just beginning to utilize the apparatus, assume now that the operator desires the enter the RECORD mode.

To enter the RECORD mode for a new tape the operator must press first the MODE key (FIG. 19) and then must depress the CLEAR key (FIG. 19) for approximately 5 seconds. The microcomputer set 100 first detects that the MODE key had been depressed and then that the CLEAR key had been depressed for the required 5 seconds. After 5 seconds the microcomputer set generates commands via the output port 105 (FIG. 2) to the deck motion control 124 to cause the tape of the cartridge 93 to be rewound. After the tape has been rewound, the deck motor mechanism is enabled by deck motion control 124 to start the tape moving in the forward direction until the beginning of the tape is found. The beginning of tape is found by utilizing emitter detector 118. The operator is now ready to begin entry of data.

Data may be entered by depressing the appropriate keys of the keyboard input-display unit 90 (FIG. 1) which are shown schematically in the keyboard switch and interrogation circuitry 111 of FIG. 19. Suppose, for example, that the data "12345" were desired to be written onto tape. The operator would depress the "1" switch, followed by the "2" switch, etc. until the five switches have been depressed. The data are then displayed in the display unit 109.

If the operator had attempted to enter data into the data entry apparatus prior to entering the RECORD mode, it would not have been accepted since the apparatus is in a no mode or idle status. The microcomputer set 100 at this time generates signals to the alarm circuitry 112, and the alarm circuitry 112 detects these signals and drives a speaker for a specified period of time. The operator is, therefore, given an audible indication that the data apparatus is not in the proper mode to accept data entry. The above described alarm is present anytime that the portable data entry apparatus is in a no mode or idle status.

In a manner to be later set forth in detail, when the portable data entry apparatus was placed in the RECORD mode, the microcomputer set 100 started scanning the keyboard switch and interrogation circuitry 111 during the "awake" time to determine if a key has been depressed. As each key in the above example was depressed, it would be detected by the microcomputer set 100 during this scan and the information corresponding to that key would be detected and would be temporarily stored in the microcomputer set 100. This stored information is then outputted to the display 109 via the segment selector 119 and the digit selector 120 during the "awake" time of power switching unit 116, thereby giving the operator a visual indication of the entered data. In the preferred embodiment of this invention up to 12 digits may be displayed for any one entry.

A primary use of the portable data entry apparatus of this invention is to enable merchandisers, e.g., supermarket chains, to employ it for ordering information.

Each type of goods that is to be ordered will have a reference designation symbol, and it is common for this reference designator to be five digits in length. The operator would enter the reference designator of the product to be ordered. Following this entry, he would enter the number of cases of that product to be ordered. For example, if the reference designator was "12345" and six cases were desired to be ordered, the operator's data input would be "1234506+." Conversely, if in the above example only five cases needed to be ordered instead of six, the operator could correct this mistake on his next entry by entering "1234501–."

When the operator of the apparatus depresses either the plus or the minus key of the keyboard 90, the microcomputer set 100 detects that fact and begins to prepare the stored information to be written onto the tape. It transmits this information in serial fashion via the output ports 105 to the read-write circuitry 107 which writes the information on the tape. The tape would then contain digitized coded signals corresponding to the data entry. Also during this write time the microcomputer set 100 has generated commands to the deck motion control 106 via the output ports 105 so that the tape may be properly positioned to accept the data. When the information is being written onto tape power switching unit 116 supplies power to the deck motion control 106 and the read-write circuitry 107.

At this point it is appropriate to point out that the portable data entry apparatus of this invention has several optional features. These include case total, auto header, and check digit verification. Check digit verification and case total are features which may be manually disabled, and auto header, if selected, becomes a permanent feature of the portable data entry apparatus.

If the auto header feature is selected, a command will be generated by microcomputer set 100 to write a reference designator and a number designator as the first entry on tape. This occurs when the beginning of the tape is found by the emitter detector 118 as described above. In the preferred embodiment of this invention, the auto header reference designator is "ACE0," and the number designator is comprised of four numbers, e.g., "1234." The reference designator is permanently stored in microcomputer set 100 and the number designator (corresponding to unit serial number) is diode programmed (944a – FIG. 19) by inserting diodes corresponding to the binary coded decimal representation of the serial number. The reference designator and the number designator are always written onto the tape as the first entry if the option is installed.

The case total option is selected by engaging the case total switch of keyboard input-display unit 90 into the "on" position. This switch is shown schematically in FIG. 19. The microcomputer set 100 detects that this option has been selected and for all the data entries keeps a running total of the number of cases of merchandise that have been ordered. This information is usable to the operator for freight and shipping information, because from case total he can estimate how many trucks are required to transport the total order to his location. The case total switch must be engaged in the "on" position during the entire time the data entry is being made in order to have an accurate case total.

Check digit verification is enabled by engaging the check digit verification switch on the keyboard input-display unit 90. This switch is shown schematically in FIG. 19. When engaged, the microcomputer set 100 manipulates entered data by either modulus 10 (double-add-double) or modulus 11 (IBM standard) check digit schemes, which are known to those skilled in the art. The data entry must be 5, 6, 7, or 8 digits for check digit verification to operate properly.

Another feature of the microcomputer set 100 is that it is capable of storing the three data entries previous to the data entry in progress. When the operator is in the record mode, the last entry on tape may be reviewed by depressing the scan key once, the second to last entry may be reviewed by depressing the scan key a second time, and the third from last entry may be displayed by depressing the scan key a third time. A fourth depression of the scan returns the operator to his entry in process, and if he had not selected an entry, the display entry will be blank. When the operator depresses the "plus" or "minus" key for the present entry, the data entry that was previously third entry back is no longer stored in the microcomputer set 100.

Another feature of the portable data entry apparatus of this invention is the end-of-data mark which is written onto the tape whenever the operator exits the record mode. The microcomputer set 100, upon detection of a mode change, automatically generates the sequence of bit signals to the read-write circuitry 107 via the output port 105. In the preferred embodiment of this invention, this entry would be displayed as "END."

Having entered data on the tape, the operator may now desire to enter the READ mode. This may be accomplished by depressing the MODE key (FIG. 19) followed by the READ key (FIG. 19). When entering the READ mode from the RECORD mode, the display will show "END." This is because the next entry on tape is the end of data mark as discussed above. When "END" is displayed, the portable data entry apparatus reverts to a no mode or idle status. At this time the microcomputer set 100 will generate a signal to the alarm circuitry 112 via the output ports 100. This signal will be used by the alarm circuitry 112 to drive a speaker, thereby informing the operator that a mode request needs to be made.

An alternative method of entering the READ mode is to depress the MODE key (FIG. 19) followed by the BACK key (FIG. 19). If the "MODE" and the "BACK" keys are depressed when in the RECORD mode, the portable data entry apparatus will back up and display the 10th entry back. This operation can be executed at any point on the tape. The apparatus displays the 10th entry back, and then automatically enters the read mode.

Yet another method of entering the READ mode is to depress the MODE key followed by the RWD key (FIG. 19). The microcomputer set 100 (FIG. 2) detects the depression of the MODE and RWD keys and generates signals to the deck motion control 106 which cause the tape to be rewound. The beginning of tape is then found with the emitter detector 118, and data may be read from the tape.

After the read mode has been entered the operator has two methods for scanning or reviewing the data. He can "SCAN" his data by successively displaying each entry, or he can "SEARCH" for a particular entry or series of entries on tape.

If the operator desires to scan the data, he does so by depressing the scan key when in the READ mode. The entry at a given tape position is then displayed until the scan key is again depressed, at which time the next entry is displayed. This process can be repeated until the end of data is reached at which time "END" is displayed.

If, on the other hand, the operator desires to search for a particular entry or series of entries he may initiate a search request. This is accomplished by depressing a data key when in the READ mode. The microcomputer set 100 detects the depression automatically as an intention to do a search operation. The operator would then enter a mask into the display. The mask is the reference designator of the type of entry that he desires to display. For example, if he desired to know the number of cases of goods of type "12345" that had been ordered, he would enter the mask "12345." The search feature is enabled by then depressing the "SCAN" key (FIG. 19) after the entry of the mask. Read-write circuitry 107 then begins to read the information that is recorded on tape in a forward direction from the point on the tape where the search is initiated. The information that is read is presented to microcomputer set 100 via the bit cell timer 108 and the input ports 104.

When a match is made, the portable data entry apparatus will terminate the search and display the complete entry from tape. A match is made when each character in the mask compares to each character of the reference designator in the entry for as many characters as were entered in the mask. If the scan key is depressed again after the first match was found, the search operation will continue with the previous mask, thereby locating all entries on the tape with that reference designator. To change the mask after a match, the operator must depress the "CLEAR" key and then enter a new mask and depress the "SCAN" key again. If, however, he desires to review entries one at a time after a match, the operator depresses the "CLEAR" key followed by the "SCAN" key.

It will be recalled from the above description of the RECORD mode that the entry into the RECORD mode was only described for a tape which contained no data. In the case that an operator desires to enter data onto a tape on which there is previously recorded data and in the case of returning to the RECORD mode after a search has been completed, the RECORD mode is entered by depressing first the MODE and then the RECORD keys. The microcomputer set 100 in its keyboard scan detects that these two keys have been depressed and generates signals to the deck motion control 106 to start the tape moving in the forward direction until the end of data mark is found. It will be recalled that any time that the portable data entry apparatus exited the RECORD mode the microcomputer set 100 generated signals to cause an end of data mark to be written onto the tape. During the time that the tape is moving in the forward direction, information is being read from the tape by read-write circuitry 107, and this information is presented to microcomputer set 100 via the bit cell timer 108 and the input ports 104. When that end of data mark is detected by the microcomputer set 100, signals are generated to the deck motion control 106 to stop the forward motion of the tape. The operator would then be at the proper place on the tape to begin additional data entries.

Having completed the data entry onto tape and, if desired, having reviewed the entered data, the operator would now or at some convenient time desire to transmit the entered data to a central location where his order would be processed. In order to transmit the information, the operator must put the portable data entry apparatus into the "SEND" mode, and this is accomplished by depressing first the "MODE" key and then the "SEND" key. The microcomputer set 100 detects that the send mode has been selected and enabled the power switching unit 116 to supply power to the modem 122. When the distant receiving end is connected to the modem the microcomputer set 100 generates commands which cause the data to be read from the tape by the read-write circuitry 107. This information is presented to the modem 122, and modem 122 translates the digital information into audio tones suitable for transmission over telephone wires. When the end of data mark is found on the tape the transmission is complete and the microcomputer set 100 generates signals which cause the tape to be rewound and then moved to the beginning of tape position. The portable data entry system is then ready to retransmit the data if required, and the display 109 will display the symbol "POLL," which indicates to the operator that the data has been transmitted.

Having now set forth the functional interrelationship of the component parts of an embodiment of this invention, it is now appropriate to describe details of the structure which accomplishes the above enumerated functions. Interconnections between the various components will be indicated in the drawings.

In the detailed description of the circuitry, the values of resistance and potentiometers are given in ohms, and, unless otherwise noted these values have a tolerance factor of ± 5 percent and a power rating of one-quarter watt. The symbols "K" and "M" are used for one thousand and one million, respectively. Unless otherwise noted, values of capacitance less than 1000 pfd will have a tolerance factor of ± 10%, values of capacitance greater than 1000 pfd will have a tolerance factor of + 80%, − 20% and the working DC voltage rating of the capacitor will be 20 volts. The identification of transistors and diodes is given in their EIA-registration number wherever possible. Transistors and diodes not having EIA-registered numbers, and operational amplifiers are identified by a Motorola Semiconductor Products, Inc. designation known to persons skilled in the art. The circuitry of this invention also utilizes digital integrated circuits to perform certain functions. The integrated circuits utilized are from the series 54L/74L, the series 54LS/74LS, and the series 54C/74C, and identification of components is made by utilizing these designators. These series and the individual integrated circuits are described in "The TTL Book for Design Engineers," published by Texas Instruments, Inc. (1973).

Figure 3:
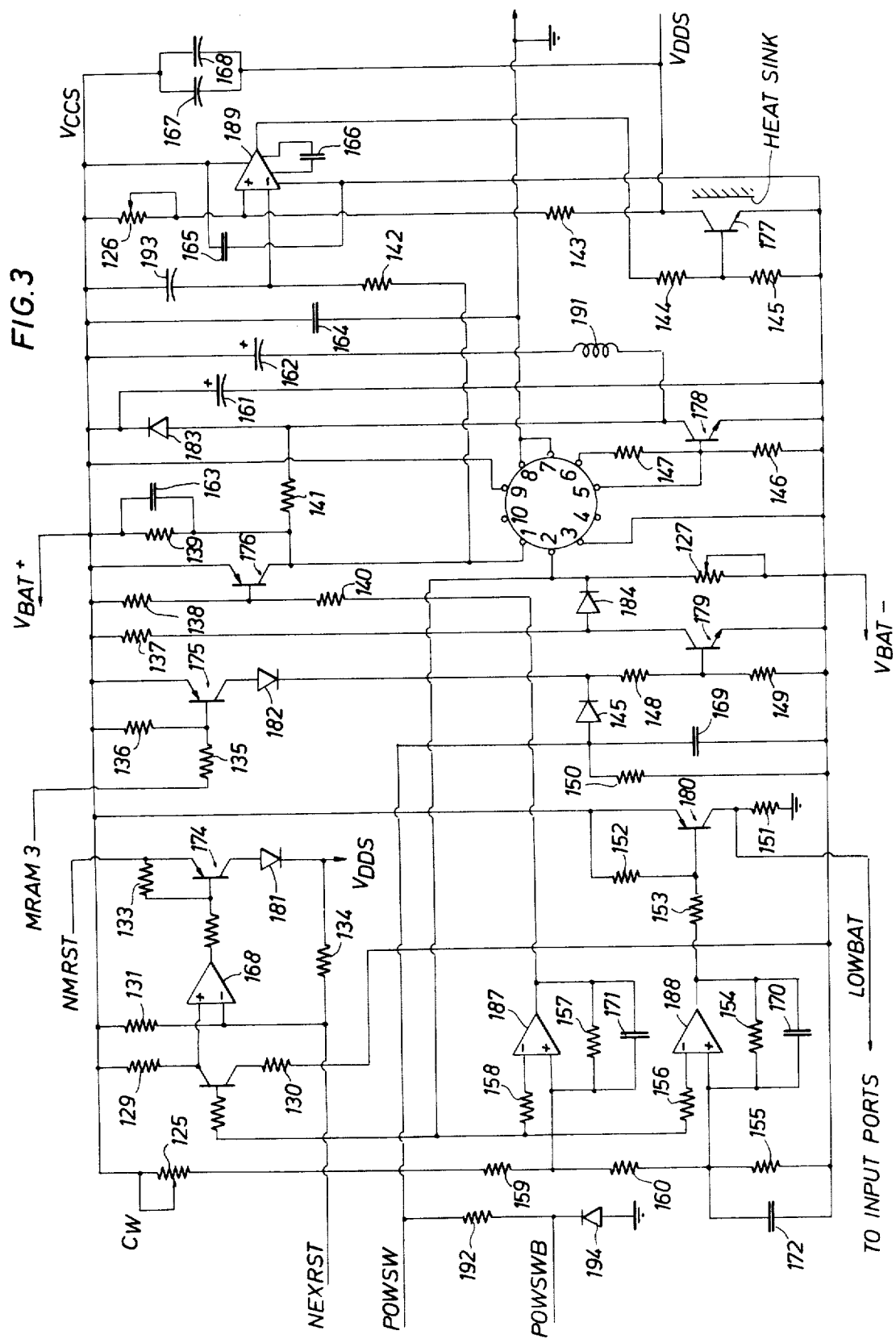
FIG. 3 is a schematic diagram of the power supply circuitry of the system of FIG. 2.

Referring now to FIG. 3, there is shown a schematic diagram of power supply 115 which is utilized in the preferred embodiment of this invention. The circuitry is comprised of potentiometers 125 through 127, resistors 192 and 128 through 160, capacitors 193 and 161 through 172, transistors 173 through 183, diodes 194 and 181 through 185, operational amplifiers 186 through 189, voltage regulator 190, and inductor 191, all connected as shown. Transistor 177 is mounted on heatsink 195.

The function of power supply 115 is to supply power to the apparatus, and it derives its source of power from high quality nickel cadmium batteries. As used in the claims, the term "battery" should be understood to include either a single cell or a plurality of cells, connected in either series or parallel, to achieve the desire volt-amp rating required for proper operation of the portable data entry apparatus. The positive and negative sides of the battery are connected to the points $v_{bat+}$ and $v_{bat-}$ respectively. Signal POWSW becomes active when the power is turned "on" and causes voltage regulator 190 to be turned on. One of the outputs of the voltage regulator 190 is a signal designated as GND. This signal is ground for the system, and when present, provides a flow path for current from $v_{cc_s}$ and $v_{dds}$ to the respective components of the portable data entry apparatus.

Since batteries provide the source of power for the apparatus of this invention, it is desirable for the operator of this apparatus to know when the battery power is becoming low. This can be accomplished by the circuitry of power supply 115 by adjusting potentiometer 125 until the voltage at the positive input to operational amplifier 118 is equal to 2.4 volts with a battery potential of 17 volts. When the battery potential difference is less than 17 volts (i.e., through use has decreased to 17 volts) the outputs of operational amplifier 188 will become active, thereby turning off transistor 180. The signal LOWBATT will then be active and inform the microcomputer set 100 (FIG. 5) of the low battery condition. Due to the programming of the microcomputer as hereinafter set forth, when the LOWBATT signal is received by the microcomputer, it proceeds to inform the operator of the low battery condition by generating appropriate signals to the digit selector 120 and to the segment selector 119. These in turn activate the display 109 with a suitable pattern, e.g., "LO." The microcomputer set 100 also commands an end of data mark to be written on the tape to insure proper termination of the data record and generates signals to the deck motion control 106 to cause the tape to be rewound approximately 16 entries.

When the potential difference across the batteries is less than 15.5 volts the output of operational amplifier 187 becomes active, thereby causing an electronic shut down of the unit by electronically disconnecting the batteries by removing substantially all the load from the batteries. This electronic shut down protects the batteries and prevents cell reversal. Cell reversal requires replacement of the batteries, since they can no longer be recharged. The electronic shut down feature of the apparatus of this invention protects, therefore, the user's investment in the batteries.

In the preferred embodiment of this invention the values of types of the various components of FIG. 3 are:

Potentiometer 125 has a maximum resistance of 10K, potentiometer 126 has a maximum resistance of 6K, and potentiometer 127 has a maximum resistance of 4K.

The values and types of the other components utilized in FIG. 3 are:
resistors 128, 130, 132, 133, 134, and 136: 20K;
resistor 129:110K;
resistor 131:75K;
resistor 135:120K;
resistors 137, 142, 156, and 158:10K;
resistors 138, 151, and 152:3.9K;
resistor 139:2.49K, 1%, 1 watt;
resistors 140 and 153:24K;
resistor 141:10M;
resistor 143:47K;
resistor 144:1K;
resistor 145:220;
resistor 146:200;
resistor 147:100;
resistors 148 and 150, and 192:27K;
resistor 149:2K;
resistors 154 and 157:150K;
resistor 155:2.4K;
resistors 159 and 160:470;
capacitors 161 and 162:47mfd;
capacitor 163:100pfd;
capacitor 164, 168, 169 and 172:.1mfd;
capacitor 193:.25mfd;
capacitor 165:.01mfd;
capacitor 166:33pfd;
capacitor 167:47mfd;
capacitors 170 and 171:.001mfd;
transistor 173:MPS 3707;
transistors 174, 175, and 180:2N4125;
transistor 176:MPS 404;
transistor 177 and 178:MJE 200;
transistor 179:MPS 5172;
diodes 181, 182, 184, and 185 and 195:1N914;
diode 183:UCD329;
operational amplifier 186, 197 and 188:MC3302 197,
operational amplifier 189:LM301 (National Semiconductor Corp);
voltage regulator 190:LM304 (National Semiconductor Corp);
inductor 191:1 millihenry.

Figure 4:
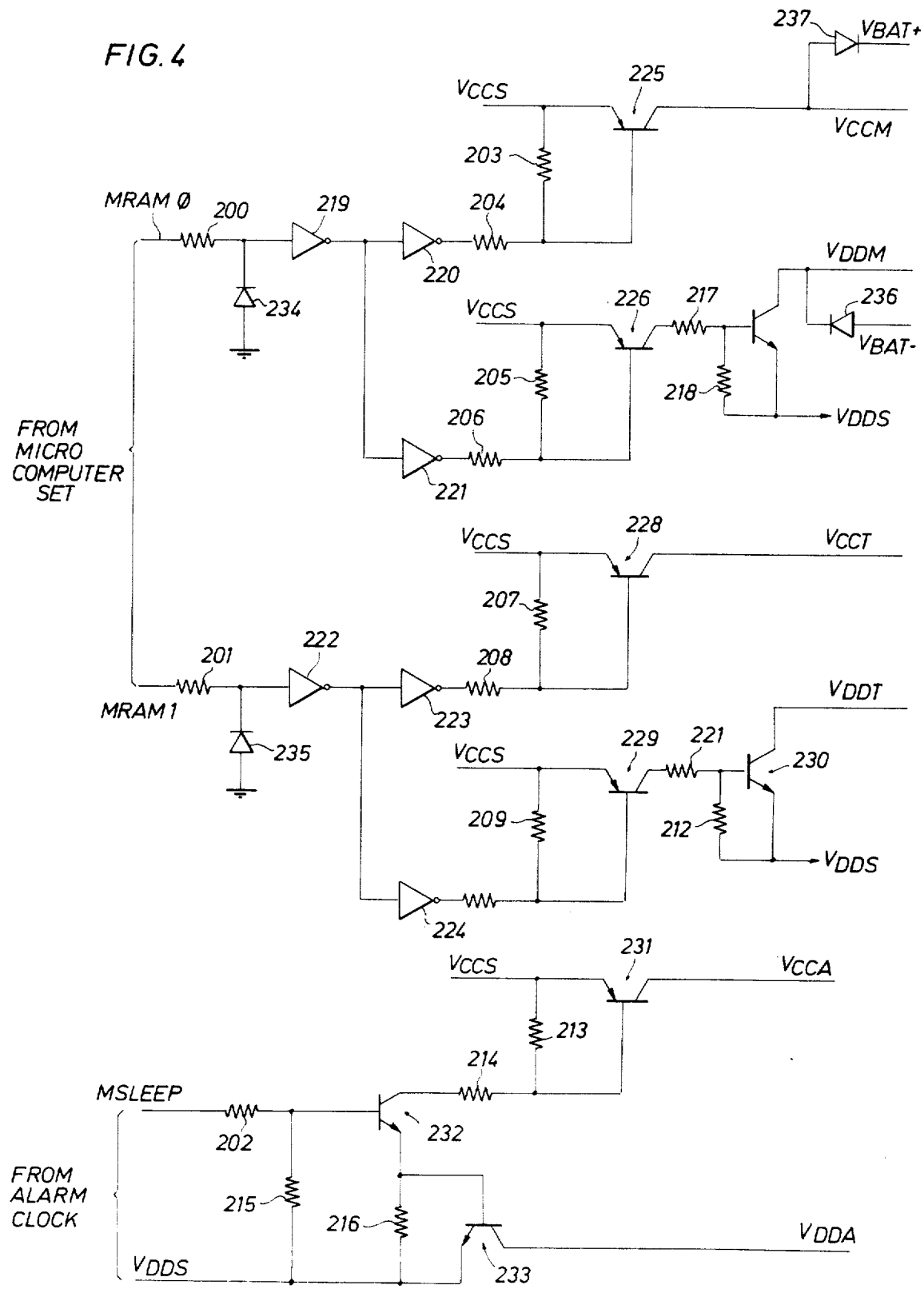
FIG. 4 is a schematic diagram of the power-switching circuitry of the system of FIG. 2.

Referring now to FIG. 4, there is shown the detailed schematic diagram of the power switching unit 116 which is utilized in the preferred embodiment of this invention. It is comprised of resistors 200 through 218, inverter elements 219 through 224, transistors 225 through 232, and diodes 233 through 236, and the devices are connected as shown.

Since the source of power for the portable data entry apparatus of this invention is batteries, it is desirable to prolong the length of time that useful battery power is available. Power switching unit 116 accomplishes this by supplying power to certain component parts only when power to those parts is required for proper operation. For example, power is supplied to the modem 121 only when the unit is in the SEND mode and the tape is moving, and power is supplied to the tape deck only when the tape is to be moved.

Furthermore, battery power is conserved in the portable data entry apparatus by switching the power ($V_{cca}$ and $V_{dda}$) to certain component parts of the apparatus at periodic intervals. The length of time that $v_{cca}$ and $v_{dda}$ are active is referred to as the "awake" time, and the length of time that $v_{cca}$ and $v_{dda}$ are inactive is referred to as the "asleep" time. In the preferred embodiment of this invention the maximum "awake" time is approximately 2.5 milliseconds, and the "asleep" time is approximately 7.5 milliseconds.

In the preferred embodiment of the portable data entry apparatus of this invention, the values and types of the components utilized in the power switching unit 116 are:
resistors 200 and 201:6.2K;
resistor 202:20K;
resistors 203, 205, 207, and 209:4.7K;
resistors 204, 206, 208, 210, 212, 213, 216 and 218:1K;
resistors 211 and 217:2.4K;
resistors 214 and 215:3.6K;
transistors 225 and 228:2N4403;
transistors 226 and 229:2N4125;

transistors 227, and 233, and 230:2N4401;
transistor 231:MJE210;
transistor 232:MPS5172;
inverters elements 219 through 224:74L04; and
diodes 234 through 237:1N914.

Figure 5:
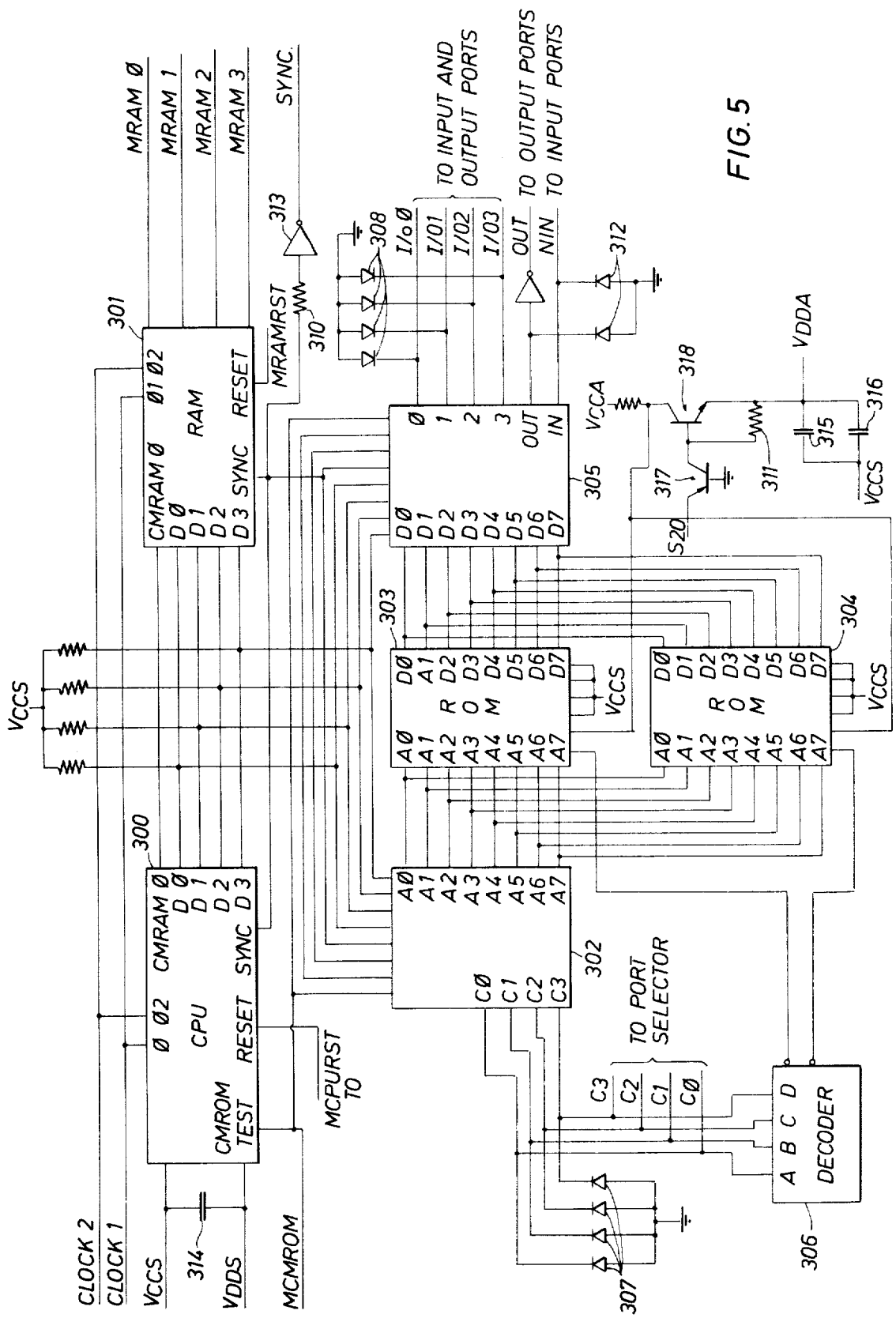
FIG. 5 is a schematic circuit diagram of a microcomputer set of the system of FIG. 2.

Referring now to FIG. 5, there is shown a portion of the microcomputer set 100 that is utilized in the preferred embodiment of this invention. It is comprised of a central processing unit (CPU) 300, a random access memory (RAM) 301, a standard memory interface set comprised of devices 302 and 305, read-only-memories (ROM) 303 and 304, decoder 306, diode 307 and 308, resistors 309, 310, and 311, diodes 312, inverter element 313, capacitors 314 through 316, and transistors 317 and 318, and the devices are connected as shown.

Central processing unit 300, RAM 301, the standard memory interface set comprised of devices 302 and 303, and ROM's 303 and 304 comprise a MCS-4 microcomputer set which is vended by Intel Corp. of Santa Clara, California. Its operation is described in their Users Manual of February 1974. For ease of presentation only two ROM's 303 and 304 are shown in FIG. 5, but in the preferred embodiment of this invention, seven ROM's are utilized in the microcomputer set 100. The ROM's not shown are connected in the same fashion as the two ROM's that are shown.

As discussed in the Intel Corp. Users Manual for the microcomputer set, CPU 300 is preferably an Intel 4004, RAM 301 is preferably an Intel 4002-1, device 302 is preferably an Intel 4008, device 305 is preferably an Intel 4009, and the ROM's are preferably Intel 1702A's.

Decoder 306 is a 74L42, and it is utilized to decode the binary values assumed by the control lines which are outputs of device 302. The output corresponding to the decoded input is used to select a particular ROM which is to be accessed. Therefore, since seven ROM's are used in the preferred embodiment of this invention, seven output lines (binary values 0–6) of decoder 306 are utilized to select the appropriate ROM. Resistors 309 are pullup resistors for the outputs of the ROM's, and in the preferred embodiment of this invention are 20K in value.

The contents of each address of each ROM are programmed to contain a particular bit configuration. When a ROM is addressed by the CPU 300, this bit configuration is available at the output of the ROM for use by the CPU 300. The particular bit configuration is, of course, dependent upon the function that is to be performed. The preferred programming of the contents of each address of each ROM is given below. Each ROM contains 256 addresses, and the contents of each address is given in the decimal equivalent of its binary value. Those skilled in the art will realize that in order to program the ROM, a conversion from decimal to binary must be accomplished.

ROM Number 1

| Addresses 0 to 127 | | | | | | | |
|---|---|---|---|---|---|---|---|
| Address | Value | Address | Value | Address | Value | Address | Value |
| 0 | 216 | 32 | 161 | 64 | 231 | 96 | 37 |
| 1 | 81 | 33 | 46 | 65 | 216 | 97 | 20 |
| 2 | 72 | 34 | 48 | 66 | 228 | 98 | 112 |
| 3 | 84 | 35 | 47 | 67 | 82 | 99 | 242 |
| 4 | 23 | 36 | 228 | 68 | 189 | 100 | 28 |
| 5 | 81 | 37 | 220 | 69 | 26 | 101 | 106 |
| 6 | 77 | 38 | 81 | 70 | 73 | 102 | 81 |
| 7 | 32 | 39 | 72 | 71 | 82 | 103 | 72 |
| 8 | 48 | 40 | 85 | 72 | 163 | 104 | 64 |
| 9 | 33 | 41 | 209 | 73 | 82 | 105 | 104 |
| 10 | 236 | 42 | 68 | 74 | 219 | 106 | 82 |
| 11 | 177 | 43 | 229 | 75 | 46 | 107 | 36 |
| 12 | 85 | 44 | 65 | 76 | 13 | 108 | 20 |
| 13 | 23 | 45 | 49 | 77 | 47 | 109 | 37 |
| 14 | 33 | 46 | 67 | 78 | 224 | 110 | 66 |
| 15 | 48 | 47 | 223 | 79 | 126 | 111 | 74 |
| 16 | 49 | 48 | 17 | 80 | 77 | 112 | 237 |
| 17 | 28 | 49 | 60 | 81 | 81 | 113 | 177 |
| 18 | 245 | 50 | 27 | 82 | 252 | 114 | 208 |
| 19 | 82 | 51 | 142 | 83 | 20 | 115 | 229 |
| 20 | 36 | 52 | 140 | 84 | 89 | 116 | 64 |
| 21 | 20 | 53 | 44 | 85 | 81 | 117 | 30 |
| 22 | 37 | 54 | 213 | 86 | 64 | 118 | 216 |
| 23 | 18 | 55 | 46 | 87 | 64 | 119 | 228 |
| 24 | 30 | 56 | 138 | 88 | 245 | 120 | 84 |
| 25 | 68 | 57 | 241 | 89 | 218 | 121 | 235 |
| 26 | 231 | 58 | 97 | 90 | 143 | 122 | 209 |
| 27 | 84 | 59 | 118 | 91 | 26 | 123 | 226 |
| 28 | 235 | 60 | 28 | 92 | 81 | 124 | 82 |
| 29 | 177 | 61 | 245 | 93 | 85 | 125 | 163 |
| 30 | 85 | 62 | 230 | 94 | 209 | 126 | 82 |
| 31 | 173 | 63 | 209 | 95 | 64 | 127 | 235 |

ROM Number 1

| Addresses 128 to 255 | | | | | | | |
|---|---|---|---|---|---|---|---|
| Address | Value | Address | Value | Address | Value | Address | Value |
| 128 | 85 | 160 | 227 | 192 | 168 | 224 | 82 |
| 129 | 156 | 161 | 46 | 193 | 246 | 225 | 137 |
| 130 | 46 | 162 | 255 | 194 | 246 | 226 | 64 |
| 131 | 93 | 163 | 47 | 195 | 18 | 227 | 37 |
| 132 | 82 | 164 | 227 | 196 | 209 | 228 | 113 |
| 133 | 196 | 165 | 82 | 197 | 33 | 229 | 157 |
| 134 | 26 | 166 | 219 | 198 | 233 | 230 | 85 |
| 135 | 209 | 167 | 81 | 199 | 96 | 231 | 178 |
| 136 | 70 | 168 | 252 | 200 | 33 | 232 | 64 |

ROM Number 1-continued

Addresses 128 to 255

| Address | Value | Address | Value | Address | Value | Address | Value |
|---|---|---|---|---|---|---|---|
| 137 | 130 | 169 | 28 | 201 | 232 | 233 | 37 |
| 138 | 69 | 170 | 85 | 202 | 28 | 234 | 0 |
| 139 | 37 | 171 | 218 | 203 | 167 | 235 | 82 |
| 140 | 65 | 172 | 143 | 204 | 176 | 236 | 36 |
| 141 | 17 | 173 | 18 | 205 | 241 | 237 | 18 |
| 142 | 28 | 174 | 40 | 206 | 97 | 238 | 30 |
| 143 | 245 | 175 | 43 | 207 | 127 | 239 | 68 |
| 144 | 230 | 176 | 209 | 208 | 197 | 240 | 60 |
| 145 | 214 | 177 | 231 | 209 | 81 | 241 | 20 |
| 146 | 228 | 178 | 32 | 210 | 64 | 242 | 235 |
| 147 | 85 | 179 | 12 | 211 | 64 | 243 | 213 |
| 148 | 178 | 180 | 33 | 212 | 0 | 244 | 229 |
| 149 | 82 | 181 | 208 | 213 | 28 | 245 | 46 |
| 150 | 189 | 182 | 224 | 214 | 245 | 246 | 44 |
| 151 | 26 | 183 | 97 | 215 | 82 | 247 | 82 |
| 152 | 157 | 184 | 33 | 216 | 36 | 248 | 196 |
| 153 | 84 | 185 | 177 | 217 | 20 | 249 | 26 |
| 154 | 235 | 186 | 233 | 218 | 37 | 250 | 253 |
| 155 | 82 | 187 | 20 | 219 | 18 | 251 | 65 |
| 156 | 163 | 188 | 209 | 220 | 30 | 252 | 7 |
| 157 | 46 | 189 | 244 | 221 | 242 | 253 | 44 |
| 158 | 128 | 190 | 242 | 222 | 28 | 254 | 64 |
| 159 | 47 | 191 | 191 | 223 | 228 | 255 | 85 |

ROM Number 2

Addresses 0 to 127

| Address | Value | Address | Value | Address | Value | Address | Value |
|---|---|---|---|---|---|---|---|
| 0 | 211 | 32 | 37 | 64 | 212 | 96 | 175 |
| 1 | 26 | 33 | 233 | 65 | 83 | 97 | 245 |
| 2 | 5 | 34 | 186 | 66 | 218 | 98 | 245 |
| 3 | 84 | 35 | 185 | 67 | 82 | 99 | 179 |
| 4 | 235 | 36 | 184 | 68 | 235 | 100 | 247 |
| 5 | 82 | 37 | 183 | 69 | 83 | 101 | 178 |
| 6 | 203 | 38 | 182 | 70 | 218 | 102 | 171 |
| 7 | 46 | 39 | 35 | 71 | 216 | 103 | 20 |
| 8 | 86 | 40 | 224 | 72 | 46 | 104 | 165 |
| 9 | 210 | 41 | 164 | 73 | 0 | 105 | 246 |
| 10 | 85 | 42 | 248 | 74 | 47 | 106 | 99 |
| 11 | 3 | 43 | 180 | 75 | 225 | 107 | 26 |
| 12 | 83 | 44 | 99 | 76 | 192 | 108 | 105 |
| 13 | 245 | 45 | 123 | 77 | 32 | 109 | 187 |
| 14 | 218 | 46 | 32 | 78 | 11 | 110 | 33 |
| 15 | 64 | 47 | 64 | 79 | 181 | 111 | 241 |
| 16 | 33 | 48 | 37 | 80 | 240 | 112 | 237 |
| 17 | 208 | 49 | 217 | 81 | 183 | 113 | 147 |
| 18 | 228 | 50 | 228 | 82 | 46 | 114 | 28 |
| 19 | 85 | 51 | 44 | 83 | 255 | 115 | 121 |
| 20 | 173 | 52 | 50 | 84 | 44 | 116 | 236 |
| 21 | 179 | 53 | 46 | 85 | 255 | 117 | 146 |
| 22 | 217 | 54 | 16 | 86 | 111 | 118 | 246 |
| 23 | 224 | 55 | 212 | 87 | 47 | 119 | 18 |
| 24 | 36 | 56 | 85 | 88 | 227 | 120 | 133 |
| 25 | 63 | 57 | 3 | 89 | 45 | 121 | 241 |
| 26 | 38 | 58 | 84 | 90 | 227 | 122 | 239 |
| 27 | 238 | 59 | 235 | 91 | 33 | 123 | 147 |
| 28 | 40 | 60 | 82 | 92 | 234 | 124 | 28 |
| 29 | 238 | 61 | 163 | 93 | 20 | 125 | 152 |
| 30 | 42 | 62 | 64 | 94 | 165 | 126 | 238 |
| 31 | 231 | 63 | 209 | 95 | 187 | 127 | 146 |

ROM Number 2

Addresses 128 to 255

| Address | Value | Address | Value | Address | Value | Address | Value |
|---|---|---|---|---|---|---|---|
| 128 | 246 | 160 | 241 | 192 | 235 | 224 | 203 |
| 129 | 26 | 161 | 20 | 193 | 81 | 225 | 214 |
| 130 | 152 | 162 | 102 | 194 | 233 | 226 | 184 |
| 131 | 238 | 163 | 67 | 195 | 117 | 227 | 250 |
| 132 | 16 | 164 | 245 | 196 | 220 | 228 | 125 |
| 133 | 236 | 165 | 113 | 197 | 35 | 229 | 208 |
| 134 | 184 | 166 | 86 | 198 | 233 | 230 | 0 |
| 135 | 219 | 167 | 33 | 199 | 36 | 231 | 0 |
| 136 | 136 | 168 | 164 | 200 | 203 | 232 | 0 |
| 137 | 18 | 169 | 228 | 201 | 115 | 233 | 0 |
| 138 | 154 | 170 | 165 | 202 | 204 | 234 | 0 |
| 139 | 185 | 171 | 229 | 203 | 171 | 235 | 0 |
| 140 | 209 | 172 | 166 | 204 | 246 | 236 | 0 |
| 141 | 186 | 173 | 230 | 205 | 187 | 237 | 211 |
| 142 | 43 | 174 | 167 | 206 | 26 | 238 | 190 |
| 143 | 236 | 175 | 231 | 207 | 246 | 239 | 241 |
| 144 | 20 | 176 | 192 | 208 | 81 | 240 | 216 |
| 145 | 150 | 177 | 36 | 209 | 232 | 241 | 136 |

ROM Number 2-continued

Addresses 128 to 255

| Address | Value | Address | Value | Address | Value | Address | Value |
|---|---|---|---|---|---|---|---|
| 146 | 208 | 178 | 15 | 210 | 82 | 242 | 184 |
| 147 | 228 | 179 | 40 | 211 | 194 | 243 | 47 |
| 148 | 105 | 180 | 224 | 212 | 26 | 244 | 226 |
| 149 | 105 | 181 | 37 | 213 | 218 | 245 | 192 |
| 150 | 185 | 182 | 209 | 214 | 223 | 246 | 219 |
| 151 | 16 | 183 | 226 | 215 | 182 | 247 | 190 |
| 152 | 162 | 184 | 82 | 216 | 65 | 248 | 126 |
| 153 | 16 | 185 | 219 | 217 | 193 | 249 | 248 |
| 154 | 168 | 186 | 179 | 218 | 65 | 250 | 65 |
| 155 | 180 | 187 | 244 | 219 | 216 | 251 | 210 |
| 156 | 182 | 188 | 189 | 220 | 0 | 252 | 83 |
| 157 | 163 | 189 | 83 | 221 | 0 | 253 | 217 |
| 158 | 181 | 190 | 217 | 222 | 0 | 254 | 82 |
| 159 | 183 | 191 | 82 | 223 | 116 | 255 | 214 |

ROM Number 3

Addresses 0 to 127

| Address | Value | Address | Value | Address | Value | Address | Value |
|---|---|---|---|---|---|---|---|
| 0 | 46 | 32 | 25 | 64 | 18 | 96 | 193 |
| 1 | 64 | 33 | 25 | 65 | 97 | 97 | 246 |
| 2 | 47 | 34 | 68 | 66 | 246 | 98 | 161 |
| 3 | 216 | 35 | 229 | 67 | 114 | 99 | 20 |
| 4 | 226 | 36 | 46 | 68 | 78 | 100 | 113 |
| 5 | 36 | 37 | 8 | 69 | 46 | 101 | 18 |
| 6 | 15 | 38 | 47 | 70 | 16 | 102 | 116 |
| 7 | 40 | 39 | 236 | 71 | 47 | 103 | 248 |
| 8 | 1 | 40 | 241 | 72 | 223 | 104 | 114 |
| 9 | 42 | 41 | 143 | 73 | 229 | 105 | 108 |
| 10 | 59 | 42 | 26 | 74 | 83 | 106 | 28 |
| 11 | 83 | 43 | 49 | 75 | 245 | 107 | 69 |
| 12 | 32 | 44 | 228 | 76 | 64 | 108 | 244 |
| 13 | 20 | 45 | 176 | 77 | 37 | 109 | 177 |
| 14 | 11 | 46 | 237 | 78 | 18 | 110 | 240 |
| 15 | 139 | 47 | 66 | 79 | 81 | 111 | 229 |
| 16 | 20 | 48 | 56 | 80 | 207 | 112 | 193 |
| 17 | 32 | 49 | 238 | 81 | 209 | 113 | 248 |
| 18 | 168 | 50 | 143 | 82 | 129 | 114 | 228 |
| 19 | 246 | 51 | 26 | 83 | 18 | 115 | 192 |
| 20 | 246 | 52 | 115 | 84 | 74 | 116 | 248 |
| 21 | 18 | 53 | 230 | 85 | 242 | 117 | 32 |
| 22 | 25 | 54 | 176 | 86 | 242 | 118 | 187 |
| 23 | 83 | 55 | 239 | 87 | 20 | 119 | 28 |
| 24 | 59 | 56 | 248 | 88 | 74 | 120 | 74 |
| 25 | 101 | 57 | 177 | 89 | 217 | 121 | 83 |
| 26 | 221 | 58 | 110 | 90 | 129 | 122 | 245 |
| 27 | 181 | 59 | 47 | 91 | 26 | 123 | 112 |
| 28 | 37 | 60 | 237 | 92 | 74 | 124 | 126 |
| 29 | 224 | 61 | 178 | 93 | 242 | 125 | 193 |
| 30 | 69 | 62 | 160 | 94 | 177 | 126 | 46 |
| 31 | 23 | 63 | 246 | 95 | 250 | 127 | 15 |

ROM Number 3

Addresses 128 to 255

| Address | Value | Address | Value | Address | Value | Address | Value |
|---|---|---|---|---|---|---|---|
| 128 | 82 | 160 | 161 | 192 | 82 | 224 | 245 |
| 129 | 237 | 161 | 224 | 193 | 235 | 225 | 26 |
| 130 | 46 | 162 | 192 | 194 | 46 | 226 | 222 |
| 131 | 14 | 163 | 82 | 195 | 47 | 227 | 208 |
| 132 | 82 | 164 | 219 | 196 | 47 | 228 | 226 |
| 133 | 196 | 165 | 83 | 197 | 234 | 229 | 218 |
| 134 | 18 | 166 | 217 | 198 | 246 | 230 | 81 |
| 135 | 121 | 167 | 85 | 199 | 127 | 231 | 72 |
| 136 | 192 | 168 | 23 | 200 | 198 | 232 | 212 |
| 137 | 85 | 169 | 28 | 201 | 191 | 233 | 83 |
| 138 | 166 | 170 | 183 | 202 | 192 | 234 | 218 |
| 139 | 35 | 171 | 82 | 203 | 208 | 235 | 46 |
| 140 | 233 | 172 | 194 | 204 | 83 | 236 | 47 |
| 141 | 99 | 173 | 18 | 205 | 218 | 237 | 210 |
| 142 | 28 | 174 | 167 | 206 | 212 | 238 | 190 |
| 143 | 149 | 175 | 82 | 207 | 82 | 239 | 47 |
| 144 | 242 | 176 | 194 | 208 | 214 | 240 | 226 |
| 145 | 224 | 177 | 18 | 209 | 234 | 241 | 190 |
| 146 | 240 | 178 | 185 | 210 | 245 | 242 | 212 |
| 147 | 35 | 179 | 85 | 211 | 26 | 243 | 190 |
| 148 | 224 | 180 | 23 | 212 | 209 | 244 | 47 |
| 149 | 35 | 181 | 20 | 213 | 208 | 245 | 190 |
| 150 | 211 | 182 | 175 | 214 | 46 | 246 | 216 |
| 151 | 235 | 183 | 64 | 215 | 32 | 247 | 226 |
| 152 | 18 | 184 | 245 | 216 | 47 | 248 | 226 |
| 153 | 69 | 185 | 46 | 217 | 226 | 249 | 0 |
| 154 | 233 | 186 | 43 | 218 | 192 | 250 | 0 |

ROM Number 3-continued

| Addresses 128 to 255 | | | | | | | |
|---|---|---|---|---|---|---|---|
| Address | Value | Address | Value | Address | Value | Address | Value |
| 155 | 179 | 187 | 66 | 219 | 216 | 251 | 25 |
| 156 | 233 | 188 | 237 | 220 | 82 | 252 | 251 |
| 157 | 242 | 189 | 218 | 221 | 214 | 253 | 127 |
| 158 | 224 | 190 | 81 | 222 | 234 | 254 | 237 |
| 159 | 35 | 191 | 72 | 223 | 245 | 255 | 192 |

ROM Number 4

| Addresses 0 to 127 | | | | | | | |
|---|---|---|---|---|---|---|---|
| Address | Value | Address | Value | Address | Value | Address | Value |
| 0 | 176 | 32 | 169 | 64 | 71 | 96 | 246 |
| 1 | 49 | 33 | 20 | 65 | 100 | 97 | 189 |
| 2 | 50 | 34 | 89 | 66 | 212 | 98 | 240 |
| 3 | 179 | 35 | 43 | 67 | 148 | 99 | 182 |
| 4 | 52 | 36 | 234 | 68 | 28 | 100 | 192 |
| 5 | 181 | 37 | 20 | 69 | 71 | 101 | 47 |
| 6 | 182 | 38 | 82 | 70 | 180 | 102 | 234 |
| 7 | 55 | 39 | 123 | 71 | 37 | 103 | 245 |
| 8 | 56 | 40 | 91 | 72 | 173 | 104 | 26 |
| 9 | 185 | 41 | 250 | 73 | 248 | 105 | 138 |
| 10 | 186 | 42 | 135 | 74 | 224 | 106 | 160 |
| 11 | 59 | 43 | 246 | 75 | 223 | 107 | 246 |
| 12 | 188 | 44 | 125 | 76 | 185 | 108 | 176 |
| 13 | 61 | 45 | 50 | 77 | 38 | 109 | 161 |
| 14 | 62 | 46 | 18 | 78 | 0 | 110 | 246 |
| 15 | 174 | 47 | 50 | 79 | 42 | 111 | 177 |
| 16 | 240 | 48 | 127 | 80 | 59 | 112 | 247 |
| 17 | 225 | 49 | 75 | 81 | 192 | 113 | 226 |
| 18 | 226 | 50 | 168 | 82 | 17 | 114 | 124 |
| 19 | 243 | 51 | 246 | 83 | 89 | 115 | 138 |
| 20 | 228 | 52 | 246 | 84 | 118 | 116 | 239 |
| 21 | 245 | 53 | 18 | 85 | 100 | 117 | 188 |
| 22 | 246 | 54 | 75 | 86 | 209 | 118 | 238 |
| 23 | 231 | 55 | 245 | 87 | 121 | 119 | 176 |
| 24 | 232 | 56 | 245 | 88 | 76 | 120 | 83 |
| 25 | 249 | 57 | 26 | 89 | 241 | 121 | 32 |
| 26 | 250 | 58 | 63 | 90 | 197 | 122 | 47 |
| 27 | 235 | 59 | 104 | 91 | 246 | 123 | 234 |
| 28 | 252 | 60 | 104 | 92 | 26 | 124 | 245 |
| 29 | 237 | 61 | 208 | 93 | 95 | 125 | 26 |
| 30 | 238 | 62 | 189 | 94 | 103 | 126 | 120 |
| 31 | 255 | 63 | 117 | 95 | 173 | 127 | 247 |

ROM Number 4

| Addresses 128 to 255 | | | | | | | |
|---|---|---|---|---|---|---|---|
| Address | Value | Address | Value | Address | Value | Address | Value |
| 128 | 226 | 160 | 176 | 192 | 197 | 224 | 228 |
| 129 | 168 | 161 | 85 | 193 | 242 | 225 | 44 |
| 130 | 246 | 162 | 156 | 194 | 242 | 226 | 69 |
| 131 | 26 | 163 | 85 | 195 | 28 | 227 | 85 |
| 132 | 139 | 164 | 166 | 196 | 198 | 228 | 211 |
| 133 | 241 | 165 | 160 | 197 | 184 | 229 | 26 |
| 134 | 245 | 166 | 20 | 198 | 233 | 230 | 243 |
| 135 | 184 | 167 | 202 | 199 | 177 | 231 | 83 |
| 136 | 32 | 168 | 64 | 200 | 48 | 232 | 245 |
| 137 | 255 | 169 | 241 | 201 | 192 | 233 | 82 |
| 138 | 192 | 170 | 241 | 202 | 46 | 234 | 219 |
| 139 | 83 | 171 | 115 | 203 | 110 | 235 | 83 |
| 140 | 32 | 172 | 179 | 204 | 82 | 236 | 217 |
| 141 | 163 | 173 | 98 | 205 | 196 | 237 | 46 |
| 142 | 241 | 174 | 212 | 206 | 46 | 238 | 43 |
| 143 | 149 | 175 | 146 | 207 | 84 | 239 | 82 |
| 144 | 28 | 176 | 28 | 208 | 44 | 240 | 237 |
| 145 | 170 | 177 | 179 | 209 | 102 | 241 | 81 |
| 146 | 241 | 178 | 178 | 210 | 210 | 242 | 64 |
| 147 | 162 | 179 | 83 | 211 | 18 | 243 | 64 |
| 148 | 148 | 180 | 32 | 212 | 215 | 244 | 37 |
| 149 | 28 | 181 | 47 | 213 | 64 | 245 | 216 |
| 150 | 170 | 182 | 234 | 214 | 33 | 246 | 83 |
| 151 | 143 | 183 | 245 | 215 | 65 | 247 | 252 |
| 152 | 26 | 184 | 26 | 216 | 55 | 248 | 46 |
| 153 | 136 | 185 | 179 | 217 | 214 | 249 | 41 |
| 154 | 209 | 186 | 240 | 218 | 46 | 250 | 82 |
| 155 | 226 | 187 | 226 | 219 | 48 | 251 | 237 |
| 156 | 46 | 188 | 35 | 220 | 47 | 252 | 46 |
| 157 | 12 | 189 | 210 | 221 | 226 | 253 | 16 |
| 158 | 82 | 190 |  | 222 | 192 | 254 | 47 |
| 159 | 237 | 191 | 18 | 223 | 211 | 255 | 226 |

ROM Number 5

Addresses 0 to 127

| Address | Value | Address | Value | Address | Value | Address | Value |
|---|---|---|---|---|---|---|---|
| 0 | 192 | 32 | 35 | 64 | 26 | 96 | 87 |
| 1 | 249 | 33 | 240 | 65 | 112 | 97 | 217 |
| 2 | 164 | 34 | 232 | 66 | 175 | 98 | 81 |
| 3 | 176 | 35 | 20 | 67 | 246 | 99 | 72 |
| 4 | 153 | 36 | 59 | 68 | 26 | 100 | 220 |
| 5 | 146 | 37 | 187 | 69 | 74 | 101 | 226 |
| 6 | 131 | 38 | 208 | 70 | 85 | 102 | 110 |
| 7 | 248 | 39 | 179 | 71 | 173 | 103 | 85 |
| 8 | 128 | 40 | 46 | 72 | 68 | 104 | 23 |
| 9 | 152 | 41 | 128 | 73 | 231 | 105 | 28 |
| 10 | 136 | 42 | 185 | 74 | 46 | 106 | 231 |
| 11 | 198 | 43 | 35 | 75 | 29 | 107 | 47 |
| 12 | 143 | 44 | 233 | 76 | 82 | 108 | 234 |
| 13 | 134 | 45 | 177 | 77 | 196 | 109 | 246 |
| 14 | 191 | 46 | 56 | 78 | 176 | 110 | 18 |
| 15 | 226 | 47 | 47 | 79 | 26 | 111 | 103 |
| 16 | 146 | 48 | 227 | 80 | 87 | 112 | 217 |
| 17 | 134 | 49 | 41 | 81 | 175 | 113 | 81 |
| 18 | 171 | 50 | 227 | 82 | 245 | 114 | 72 |
| 19 | 161 | 51 | 99 | 83 | 26 | 115 | 222 |
| 20 | 140 | 52 | 111 | 84 | 97 | 116 | 226 |
| 21 | 192 | 53 | 221 | 85 | 64 | 117 | 46 |
| 22 | 199 | 54 | 177 | 86 | 37 | 118 | 8 |
| 23 | 34 | 55 | 113 | 87 | 85 | 119 | 82 |
| 24 | 45 | 56 | 55 | 88 | 23 | 120 | 237 |
| 25 | 35 | 57 | 123 | 89 | 28 | 121 | 47 |
| 26 | 239 | 58 | 43 | 90 | 231 | 122 | 220 |
| 27 | 176 | 59 | 192 | 91 | 46 | 123 | 226 |
| 28 | 98 | 60 | 46 | 92 | 29 | 124 | 209 |
| 29 | 35 | 61 | 110 | 93 | 82 | 125 | 83 |
| 30 | 239 | 62 | 82 | 94 | 196 | 126 | 252 |
| 31 | 178 | 63 | 196 | 95 | 26 | 127 | 219 |

ROM Number 5

Addresses 128 to 255

| Address | Value | Address | Value | Address | Value | Address | Value |
|---|---|---|---|---|---|---|---|
| 128 | 82 | 160 | 83 | 192 | 197 | 224 | 23 |
| 129 | 230 | 161 | 101 | 193 | 242 | 225 | 20 |
| 130 | 46 | 162 | 250 | 194 | 245 | 226 | 160 |
| 131 | 14 | 163 | 43 | 195 | 245 | 227 | 67 |
| 132 | 82 | 164 | 191 | 196 | 16 | 228 | 160 |
| 133 | 237 | 165 | 154 | 197 | 242 | 229 | 84 |
| 134 | 34 | 166 | 26 | 198 | 212 | 230 | 254 |
| 135 | 0 | 167 | 172 | 199 | 180 | 231 | 83 |
| 136 | 36 | 168 | 223 | 200 | 37 | 232 | 245 |
| 137 | 0 | 169 | 191 | 201 | 180 | 233 | 64 |
| 138 | 32 | 170 | 68 | 202 | 216 | 234 | 33 |
| 139 | 255 | 171 | 198 | 203 | 226 | 235 | 82 |
| 140 | 46 | 172 | 168 | 204 | 212 | 236 | 203 |
| 141 | 111 | 173 | 246 | 205 | 18 | 237 | 212 |
| 142 | 82 | 174 | 246 | 206 | 209 | 238 | 83 |
| 143 | 196 | 175 | 18 | 207 | 105 | 239 | 252 |
| 144 | 46 | 176 | 156 | 208 | 214 | 240 | 82 |
| 145 | 16 | 177 | 219 | 209 | 43 | 241 | 189 |
| 146 | 47 | 178 | 155 | 210 | 226 | 242 | 26 |
| 147 | 26 | 179 | 20 | 211 | 38 | 243 | 240 |
| 148 | 151 | 180 | 185 | 212 | 160 | 244 | 83 |
| 149 | 216 | 181 | 83 | 213 | 83 | 245 | 252 |
| 150 | 16 | 182 | 61 | 214 | 101 | 246 | 82 |
| 151 | 219 | 183 | 68 | 215 | 83 | 247 | 185 |
| 152 | 231 | 184 | 156 | 216 | 32 | 248 | 82 |
| 153 | 243 | 185 | 241 | 217 | 20 | 249 | 189 |
| 154 | 247 | 186 | 165 | 218 | 213 | 250 | 26 |
| 155 | 230 | 187 | 147 | 219 | 17 | 251 | 237 |
| 156 | 40 | 188 | 243 | 220 | 229 | 252 | 65 |
| 157 | 16 | 189 | 164 | 221 | 83 | 253 | 71 |
| 158 | 42 | 190 | 146 | 222 | 101 | 254 | 211 |
| 159 | 59 | 191 | 26 | 223 | 85 | 255 | 44 |

ROM Number 6

Addresses 0 to 127

| Address | Value | Address | Value | Address | Value | Address | Value |
|---|---|---|---|---|---|---|---|
| 0 | 3 | 32 | 246 | 64 | 37 | 96 | 242 |
| 1 | 46 | 33 | 26 | 65 | 82 | 97 | 230 |
| 2 | 33 | 34 | 36 | 66 | 137 | 98 | 131 |
| 3 | 180 | 35 | 206 | 67 | 210 | 99 | 18 |
| 4 | 209 | 36 | 192 | 68 | 129 | 100 | 97 |
| 5 | 85 | 37 | 32 | 69 | 20 | 101 | 85 |
| 6 | 174 | 38 | 0 | 70 | 75 | 102 | 178 |
| 7 | 179 | 39 | 28 | 71 | 242 | 103 | 81 |
| 8 | 164 | 40 | 144 | 72 | 242 | 104 | 64 |

ROM Number 6-continued

Addresses 0 to 127

| Address | Value | Address | Value | Address | Value | Address | Value |
|---|---|---|---|---|---|---|---|
| 9 | 224 | 41 | 82 | 73 | 26 | 105 | 118 |
| 10 | 244 | 42 | 36 | 74 | 63 | 106 | 142 |
| 11 | 242 | 43 | 20 | 75 | 46 | 107 | 226 |
| 12 | 180 | 44 | 63 | 76 | 79 | 108 | 83 |
| 13 | 188 | 45 | 18 | 77 | 82 | 109 | 245 |
| 14 | 189 | 46 | 144 | 78 | 196 | 110 | 85 |
| 15 | 190 | 47 | 242 | 79 | 26 | 111 | 209 |
| 16 | 191 | 48 | 20 | 80 | 83 | 112 | 85 |
| 17 | 35 | 49 | 65 | 81 | 86 | 113 | 166 |
| 18 | 224 | 50 | 46 | 82 | 76 | 114 | 177 |
| 19 | 99 | 51 | 63 | 83 | 46 | 115 | 209 |
| 20 | 116 | 52 | 47 | 84 | 77 | 116 | 230 |
| 21 | 13 | 53 | 239 | 85 | 82 | 117 | 84 |
| 22 | 192 | 54 | 248 | 86 | 196 | 118 | 254 |
| 23 | 38 | 55 | 18 | 87 | 26 | 119 | 34 |
| 24 | 80 | 56 | 58 | 88 | 91 | 120 | 15 |
| 25 | 39 | 57 | 211 | 89 | 85 | 121 | 44 |
| 26 | 234 | 58 | 231 | 90 | 250 | 122 | 1 |
| 27 | 245 | 59 | 113 | 91 | 81 | 123 | 223 |
| 28 | 18 | 60 | 63 | 92 | 177 | 124 | 99 |
| 29 | 31 | 61 | 85 | 93 | 85 | 125 | 35 |
| 30 | 207 | 62 | 178 | 94 | 166 | 126 | 224 |
| 31 | 246 | 63 | 64 | 95 | 238 | 127 | 125 |

ROM Number 6

Addresses 128 to 255

| Address | Value | Address | Value | Address | Value | Address | Value |
|---|---|---|---|---|---|---|---|
| 128 | 124 | 160 | 224 | 192 | 43 | 224 | 17 |
| 129 | 81 | 161 | 126 | 193 | 227 | 225 | 248 |
| 130 | 177 | 162 | 159 | 194 | 40 | 226 | 250 |
| 131 | 221 | 163 | 127 | 195 | 4 | 227 | 234 |
| 132 | 179 | 164 | 159 | 196 | 41 | 228 | 20 |
| 133 | 82 | 165 | 192 | 197 | 240 | 229 | 224 |
| 134 | 185 | 166 | 34 | 198 | 187 | 230 | 127 |
| 135 | 35 | 167 | 60 | 199 | 234 | 231 | 224 |
| 136 | 224 | 168 | 35 | 200 | 245 | 232 | 46 |
| 137 | 226 | 169 | 238 | 201 | 245 | 233 | 11 |
| 138 | 85 | 170 | 231 | 202 | 241 | 234 | 234 |
| 139 | 209 | 171 | 178 | 203 | 246 | 235 | 28 |
| 140 | 64 | 172 | 192 | 204 | 241 | 236 | 232 |
| 141 | 32 | 173 | 208 | 205 | 246 | 237 | 126 |
| 142 | 64 | 174 | 34 | 206 | 137 | 238 | 234 |
| 143 | 0 | 175 | 32 | 207 | 185 | 239 | 127 |
| 144 | 85 | 176 | 35 | 208 | 192 | 240 | 234 |
| 145 | 173 | 177 | 231 | 209 | 44 | 241 | 125 |
| 146 | 161 | 178 | 85 | 210 | 79 | 242 | 218 |
| 147 | 248 | 179 | 166 | 211 | 82 | 243 | 46 |
| 148 | 20 | 180 | 35 | 212 | 219 | 244 | 63 |
| 149 | 61 | 181 | 224 | 213 | 82 | 245 | 82 |
| 150 | 213 | 182 | 99 | 214 | 214 | 246 | 237 |
| 151 | 145 | 183 | 35 | 215 | 213 | 247 | 241 |
| 152 | 28 | 184 | 224 | 216 | 83 | 248 | 65 |
| 153 | 119 | 185 | 192 | 217 | 218 | 249 | 64 |
| 154 | 65 | 186 | 40 | 218 | 45 | 250 | 85 |
| 155 | 19 | 187 | 137 | 219 | 216 | 251 | 186 |
| 156 | 46 | 188 | 42 | 220 | 226 | 252 | 147 |
| 157 | 12 | 189 | 255 | 221 | 46 | 253 | 184 |
| 158 | 208 | 190 | 41 | 222 | 59 | 254 | 162 |
| 159 | 47 | 191 | 227 | 223 | 47 | 255 | 186 |

ROM Number 7

Addresses 0 to 127

| Address | Value | Address | Value | Address | Value | Address | Value |
|---|---|---|---|---|---|---|---|
| 0 | 46 | 32 | 38 | 64 | 191 | 96 | 26 |
| 1 | 0 | 33 | 248 | 65 | 190 | 97 | 166 |
| 2 | 234 | 34 | 28 | 66 | 189 | 98 | 185 |
| 3 | 245 | 35 | 75 | 67 | 188 | 99 | 41 |
| 4 | 18 | 36 | 44 | 68 | 43 | 100 | 233 |
| 5 | 225 | 37 | 16 | 69 | 235 | 101 | 241 |
| 6 | 245 | 38 | 189 | 70 | 251 | 102 | 251 |
| 7 | 26 | 39 | 241 | 71 | 224 | 103 | 18 |
| 8 | 12 | 40 | 172 | 72 | 106 | 104 | 217 |
| 9 | 44 | 41 | 141 | 73 | 127 | 105 | 125 |
| 10 | 16 | 42 | 28 | 74 | 65 | 106 | 113 |
| 11 | 70 | 43 | 46 | 75 | 192 | 107 | 139 |
| 12 | 60 | 44 | 26 | 76 | 175 | 108 | 251 |
| 13 | 43 | 45 | 75 | 77 | 246 | 109 | 20 |
| 14 | 233 | 46 | 97 | 78 | 26 | 110 | 127 |
| 15 | 251 | 47 | 113 | 79 | 128 | 111 | 66 |
| 16 | 18 | 48 | 60 | 80 | 85 | 112 | 69 |
| 17 | 75 | 49 | 241 | 81 | 186 | 113 | 105 |

ROM Number 7-continued

Addresses 0 to 127

| Address | Value | Address | Value | Address | Value | Address | Value |
|---|---|---|---|---|---|---|---|
| 18 | 107 | 50 | 46 | 82 | 180 | 114 | 169 |
| 19 | 188 | 51 | 153 | 83 | 169 | 115 | 246 |
| 20 | 189 | 52 | 218 | 84 | 147 | 116 | 233 |
| 21 | 120 | 53 | 156 | 85 | 18 | 117 | 26 |
| 22 | 13 | 54 | 241 | 86 | 217 | 118 | 121 |
| 23 | 211 | 55 | 251 | 87 | 131 | 119 | 241 |
| 24 | 137 | 56 | 188 | 88 | 244 | 120 | 245 |
| 25 | 147 | 57 | 249 | 89 | 189 | 121 | 251 |
| 26 | 26 | 58 | 157 | 90 | 162 | 122 | 139 |
| 27 | 75 | 59 | 189 | 91 | 184 | 123 | 251 |
| 28 | 20 | 60 | 42 | 92 | 175 | 124 | 187 |
| 29 | 39 | 61 | 15 | 93 | 245 | 125 | 70 |
| 30 | 248 | 62 | 241 | 94 | 245 | 126 | 99 |
| 31 | 20 | 63 | 220 | 95 | 208 | 127 | 192 |

ROM Number 7

Addresses 128 to 255

| Address | Value | Address | Value | Address | Value | Address | Value |
|---|---|---|---|---|---|---|---|
| 128 | 67 | 160 | 123 | 192 | 251 | 224 | 111 |
| 129 | 245 | 161 | 146 | 193 | 18 | 225 | 192 |
| 130 | 85 | 162 | 220 | 194 | 196 | 226 | 163 |
| 131 | 178 | 163 | 224 | 195 | 242 | 227 | 20 |
| 132 | 179 | 164 | 69 | 196 | 180 | 228 | 225 |
| 133 | 217 | 165 | 91 | 197 | 241 | 229 | 240 |
| 134 | 224 | 166 | 147 | 198 | 118 | 230 | 43 |
| 135 | 38 | 167 | 18 | 199 | 190 | 231 | 233 |
| 136 | 171 | 168 | 217 | 200 | 218 | 232 | 251 |
| 137 | 40 | 169 | 41 | 201 | 133 | 233 | 18 |
| 138 | 208 | 170 | 233 | 202 | 18 | 234 | 247 |
| 139 | 42 | 171 | 189 | 203 | 172 | 235 | 107 |
| 140 | 7 | 172 | 209 | 204 | 117 | 236 | 120 |
| 141 | 46 | 173 | 181 | 205 | 175 | 237 | 230 |
| 142 | 133 | 174 | 241 | 206 | 173 | 238 | 210 |
| 143 | 36 | 175 | 169 | 207 | 251 | 239 | 43 |
| 144 | 255 | 176 | 20 | 208 | 18 | 240 | 235 |
| 145 | 16 | 177 | 206 | 209 | 217 | 241 | 20 |
| 146 | 99 | 178 | 248 | 210 | 132 | 242 | 36 |
| 147 | 47 | 179 | 185 | 211 | 251 | 243 | 242 |
| 148 | 227 | 180 | 241 | 212 | 26 | 244 | 242 |
| 149 | 37 | 181 | 41 | 213 | 215 | 245 | 20 |
| 150 | 227 | 182 | 233 | 214 | 248 | 246 | 36 |
| 151 | 43 | 183 | 251 | 215 | 20 | 247 | 28 |
| 152 | 234 | 184 | 18 | 216 | 225 | 248 | 225 |
| 153 | 185 | 185 | 217 | 217 | 240 | 249 | 171 |
| 154 | 184 | 186 | 244 | 218 | 179 | 250 | 185 |
| 155 | 183 | 187 | 182 | 219 | 35 | 251 | 240 |
| 156 | 182 | 188 | 70 | 220 | 179 | 252 | 70 |
| 157 | 35 | 189 | 197 | 221 | 233 | 253 | 18 |
| 158 | 224 | 190 | 164 | 222 | 251 | 254 | |
| 159 | 111 | 191 | 133 | 223 | 26 | 255 | |

Figure 6:
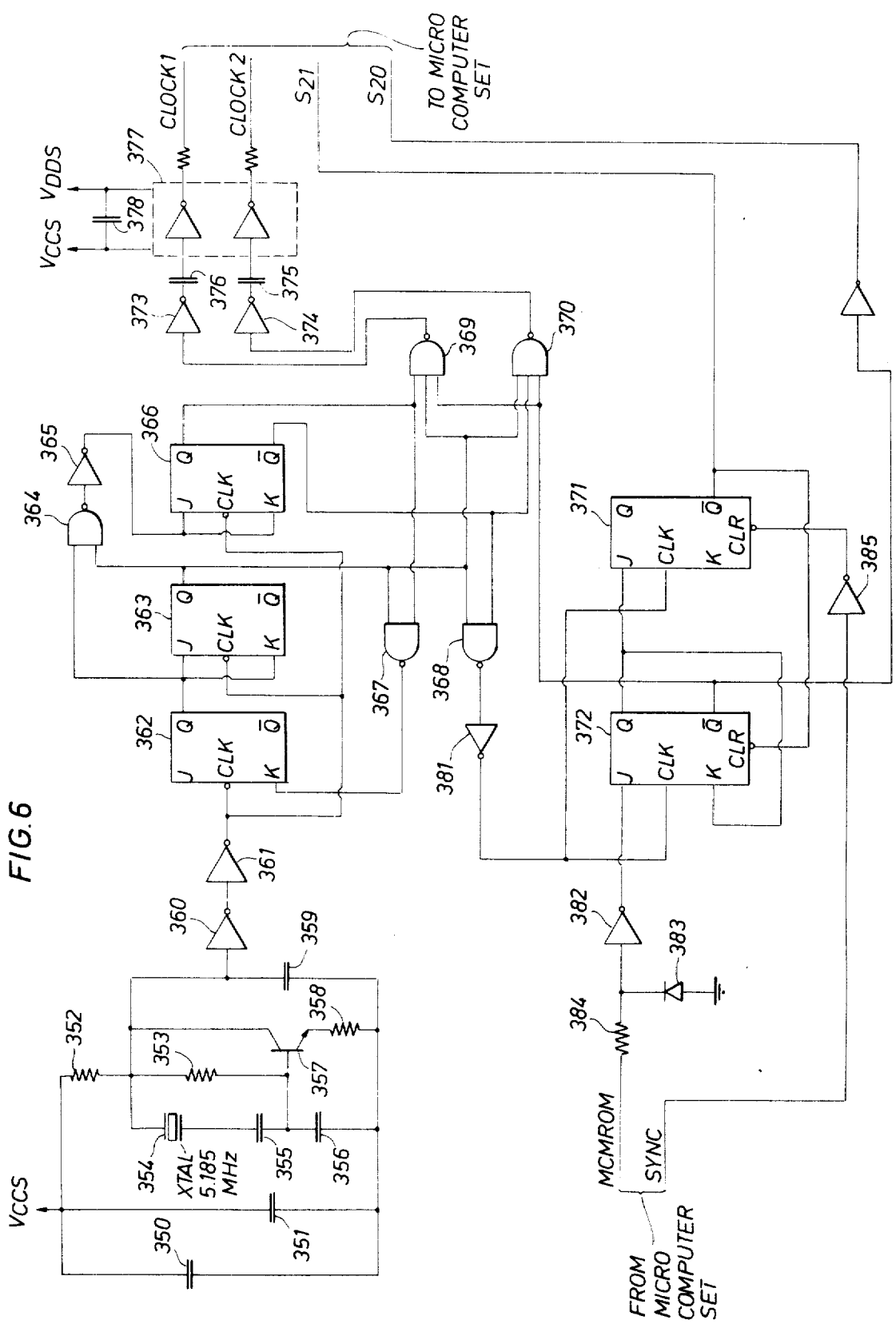
FIG. 6 is a schematic diagram of clock generation circuitry of the system of FIG. 2.

Referring now to FIG. 6, there is shown the detail schematic diagram of the clock 102 which is used in the preferred embodiment of this invention. The circuitry is comprised of capacitors 350, 351, 355, 356, 359, 375, 376, and 378, crystal 354, resistors 352, 353, 358, 379, 380, and 384, transistor 357, inverter elements 360, 361, 365, 373, 374, 381, 382 and 385, NAND gates 364 and 367 through 370, NAND gates 369 and 370, flip flops 362, 363, 366, 371, and 372, MOS driver 367, and diode 383, connected as shown.

Reference to the Intel Corp. User's Manual for the MCS-4 microcomputer set reveals that the microcomputer has an instruction cycle time of 10.8 microseconds. During this instruction cycle two clocks must each have active states eight times. These clock pulses are provided by the clock circuitry shown in FIG. 6.

In the preferred embodiment of this invention, crystal 354 has a frequency of 5.185 MHz. This frequency is counted down by the divide by seven counter comprised of flip-flops 362, 363, and 366. The frequency of the outputs of NAND gates 369 and 370 are, therefore, one-seventh of 5.185 Mhz. The inverted outputs of these NAND gates furnish the two clocks required by the microcomputer set 100.

The values and types of the various enumerated components should be:
capacitor 350:.01mfd;
capacitor 351:10mfd;
capacitors 355 and 356:68pfd;
capacitor 359:33 pfd;
capacitor 378:05 mfd;
capacitors 375 and 376:.001 mfd;
transistor 357:MPS 5172;
resistor 352:2.2K;
resistor 353:24K;
resistor 358:51;
resistors 379 and 380:10;
resistor 384:6.2K;
NAND gates 364, 367, and 368:74LS00
inverter element 360, 361, 365, 373, 374, 381, and 382:74LS04;
inverter element 385:74L04;
NAND gates 369 and 370:74LS10;
flip flops 362, 363, 366, 371, and 372:74LS73;

MOS driver 377:MH0026CN (National Semiconductor Inc.); and
diode 383:1N914.

Figure 7:
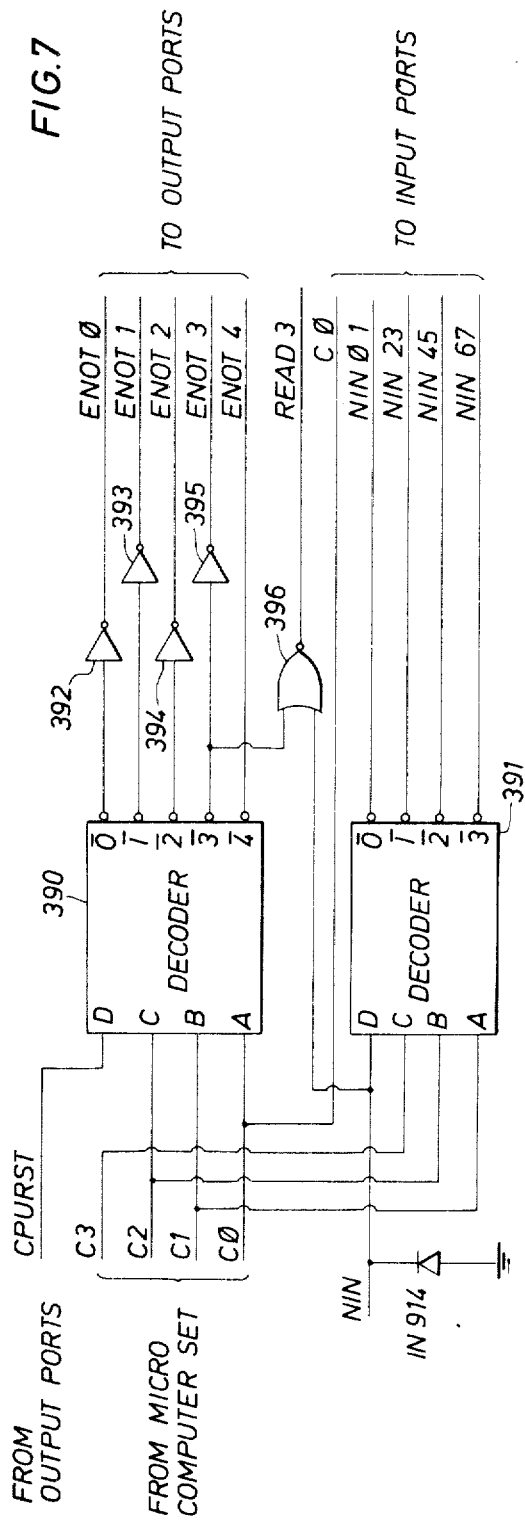
FIG. 7 is a schematic diagram of the port selector circuitry of the system of FIG. 2.

Referring now to FIG. 7, there is shown a detailed schematic diagram of the port selector 103 that is used in the portable data entry apparatus of this invention. The circuitry is comprised of decoders 390 and 391, inverter elements 392 through 395, NOR gate 396, and diode 397 and is connected as shown.

As shown, the inputs to decoder 390 are the control signals C0, C1, and C2 from the microcomputer set 100 and the signal CPURST from the output port 105. The binary value of these inputs is decoded by decoder 390, and depending on the value of the inputs, one and only one of decoder 390's outputs will be active at any one time. The active output is used to select the appropriate output port to which the microcomputer set will output information via the input/output lines of device 305 (FIG. 5).

The inputs to decoder 391 are the control signals C1, C2, C3, and NIN from the microcomputer set. The decoder 391 decodes the binary value of these inputs, and one of the outputs NIN01, NIN23, NIN45, or NIN67 will be active depending upon the value of the input. The active output is used to select the input port from which data will be entered into device 305 via the input/output lines shown in FIG. 5.

In the preferred embodiment of the invention, the type of each element in the port selector circuitry is:
 decoders 390 and 391:74L42;
 inverter element 392 through 395:74L04;
 NOR gate 396:74L02; and
 diode 397:1N914.

Figure 8:
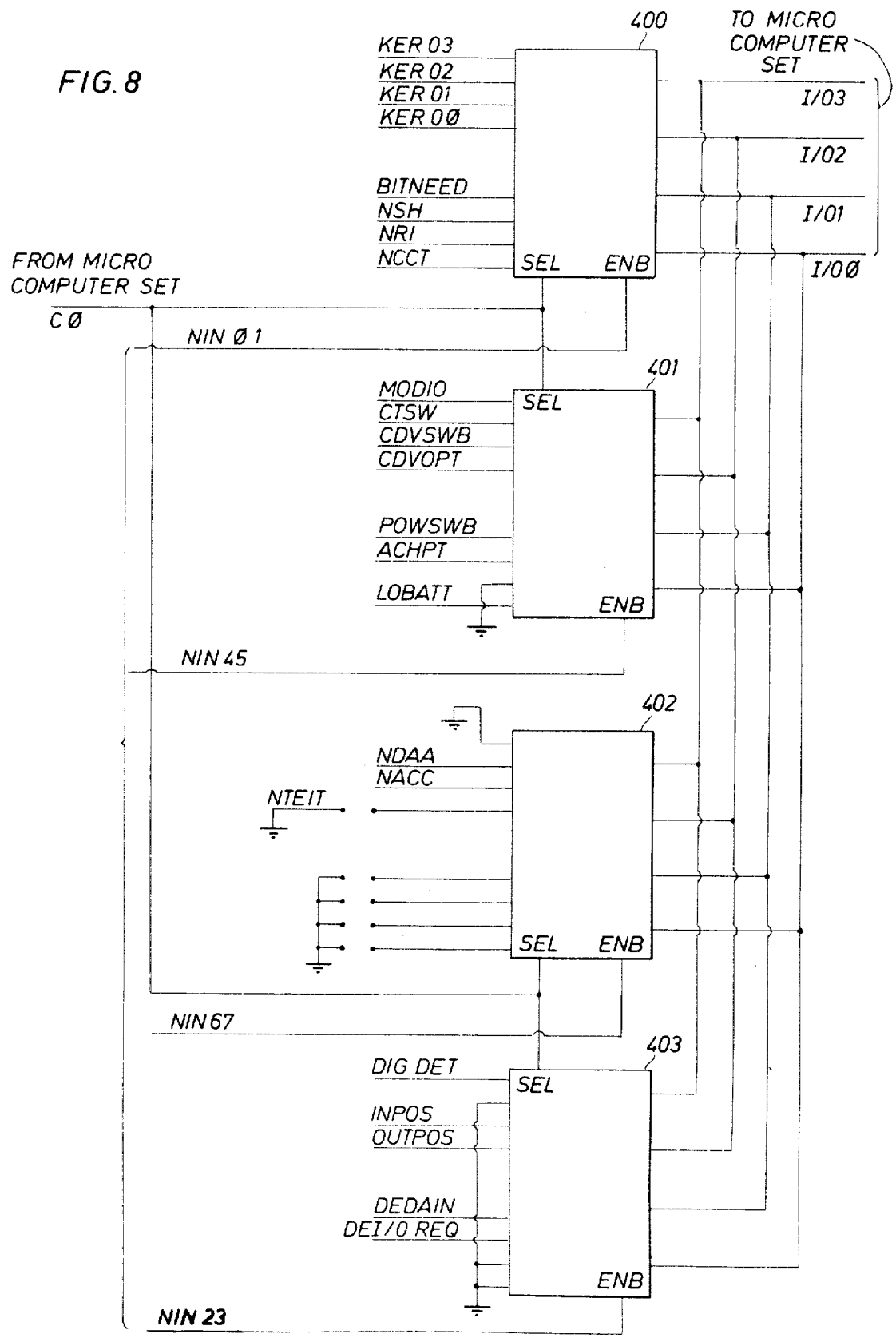
FIG. 8 is a schematic diagram of the input port circuitry of the system of FIG. 2.

Referring now to FIG. 8, there is shown the input port circuitry which is utilized in the preferred embodiment of this invention. As shown it is comprised of data selectors 400 through 403. The data selectors are preferably 81L23's which are manufactured by National Semiconductor Corporation.

Figure 9:
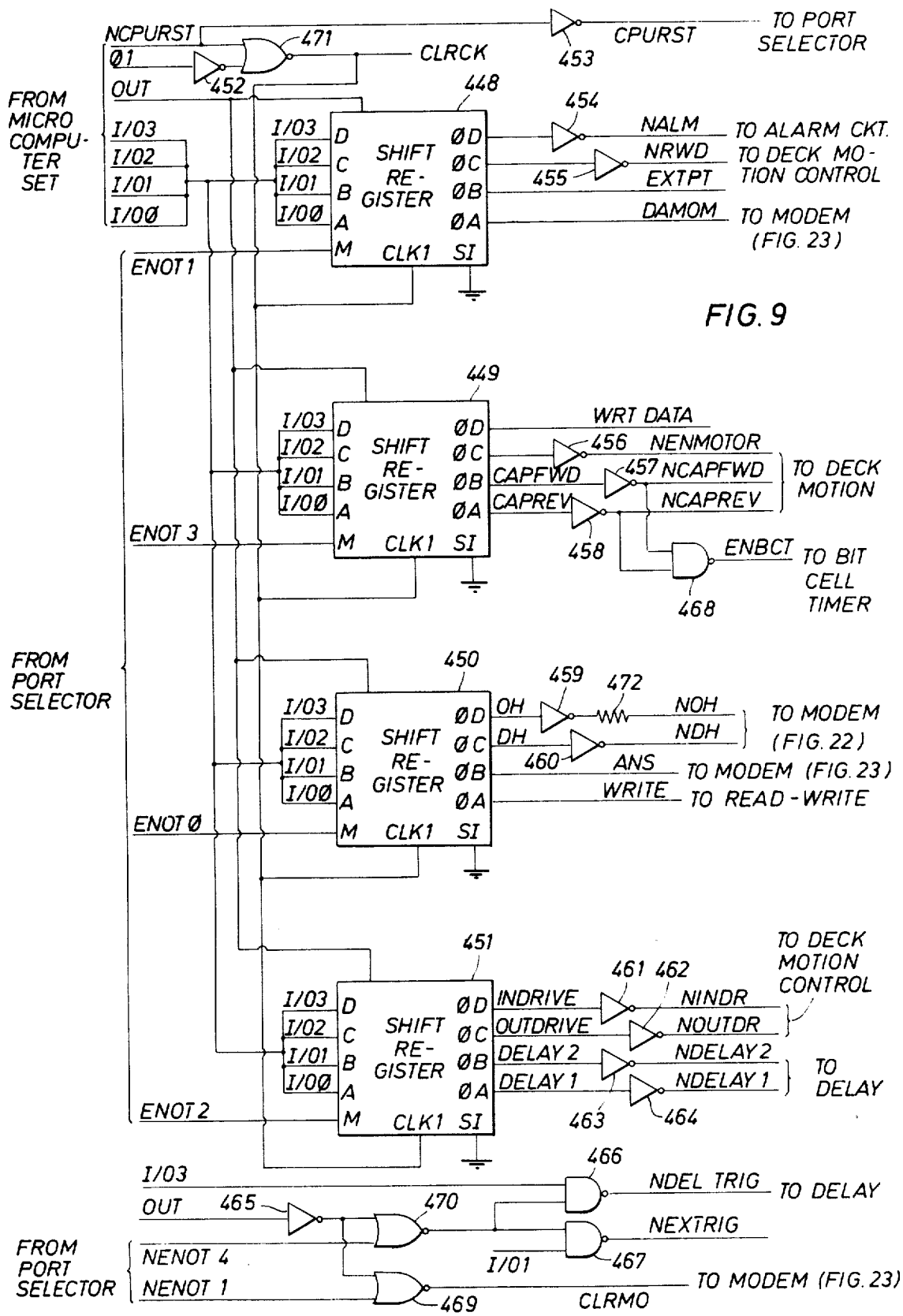
FIG. 9 is a schematic diagram of the output port circuitry of the system of FIG. 2.

Referring now to FIG. 9, there is shown the output port circuitry 105 of FIG. 2 that is utilized in the portable data entry apparatus of this invention. It is comprised of storage devices 448 through 451, inverter elements 452 through 465, NAND gates 366 thrugh 368, NOR gates 369 through 371, and resistor 372 and is connected as shown.

The data inputs to the output port 105 are the bidirectional input/output lines from device 305 as shown in FIG. 5. One of the other input signals ENOT$\phi$ through ENOT4 from the port selector 103, selects a storage element (448, 449, 450, or 451) into which data on the input/output lines is to be loaded. The data present at the output of the device selected has the same logical value as the input.

The types of the devices utilized in the preferred embodiment of this invention for implementation of the output port 105 are:
 storage devices 448 through 451:74L95;
 inverting elements 452 through 465:74L904;
 NAND gates 466 through 468:74L00;
 NOR gates 469 through 471:74L02; and
 resistor 472:4.7K.

Figure 10:
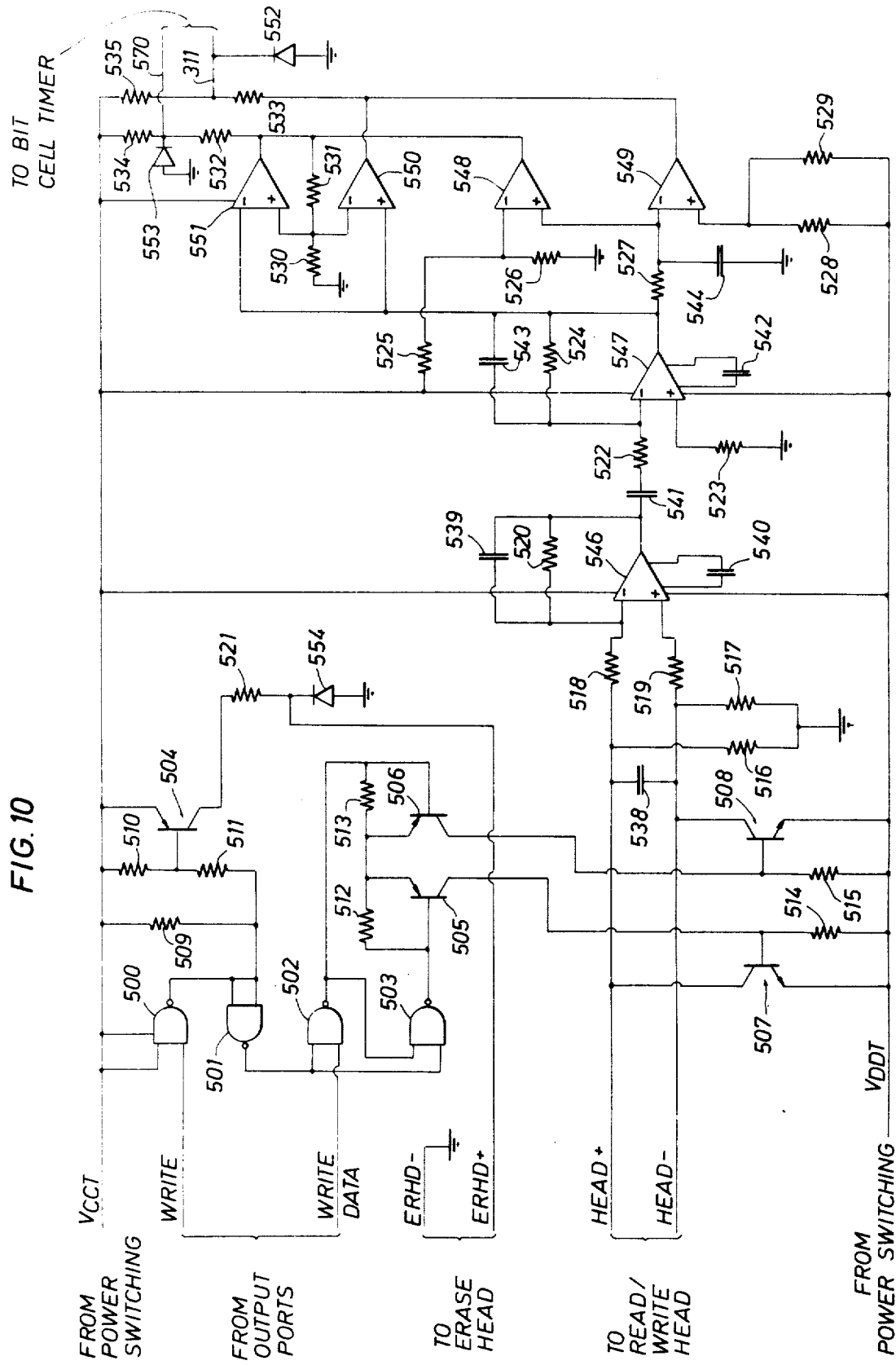
FIG. 10 is a schematic diagram of the read-write circuitry of the system of FIG. 2.

Referring now to FIG. 10, there is shown the read-write circuitry 107 of FIG. 2 which is utilized in the preferred embodiment of this invention. The circuitry is comprised of NAND gates 500 through 503, transistors 504 through 508, resistors 509 through 535, capacitors 538 through 544, operational amplifiers 546 and 547, comparators 549 through 551, and diodes 552 through 554, all connected as shown.

The function of the circuitry shown in FIG. 10 is to write digitized information onto tape and to read digitized information from tape upon command. Data is written onto tape when the command WRITE is a logical one, and while data from the tape is always available at the output of read-write circuitry 107, it is utilized only upon command from the microcomputer set 100.

In the preferred embodiment of this invention the values and types of the components utilized in FIG. 10 are:
 NAND gates 500 through 503:74L00;
 transistor 504:2N4403;
 transistors 505 and 506:2N4125;
 transistors 507 and 508:2N5172;
 resistors 509 and 510:1K;
 resistor 511:3.3K;
 resistors 512 through 515 and 530:2.7K;
 resistor 516 and 517:10K;
 resistor 518 and 519:20K;
 resistor 520 and 531:3M;
 resistor 521:82;
 resistor 522:4.7K;
 resistors 523, 525, and 527:47K;
 resistors 524 and 528:91K;
 resistor 526:2K;
 resistor 529:2.2K;
 resistor 532 and 533:15K;
 resistors 534 and 535:10K;
 capacitor 538:150pfd;
 capacitors 539 and 540:10pfd;
 capacitor 541:.01mfd;
 capacitor 542:33pfd;
 capacitor 543:500pfd;
 capacitor 544:.01mfd;
 operational amplifiers 546 and 547:LM301 (National Semiconductor Corp);
 comparators 549 through 5551:LM339 (National Semiconductor Corp); and
 diodes 552 through 554:1N914.

Figure 11:
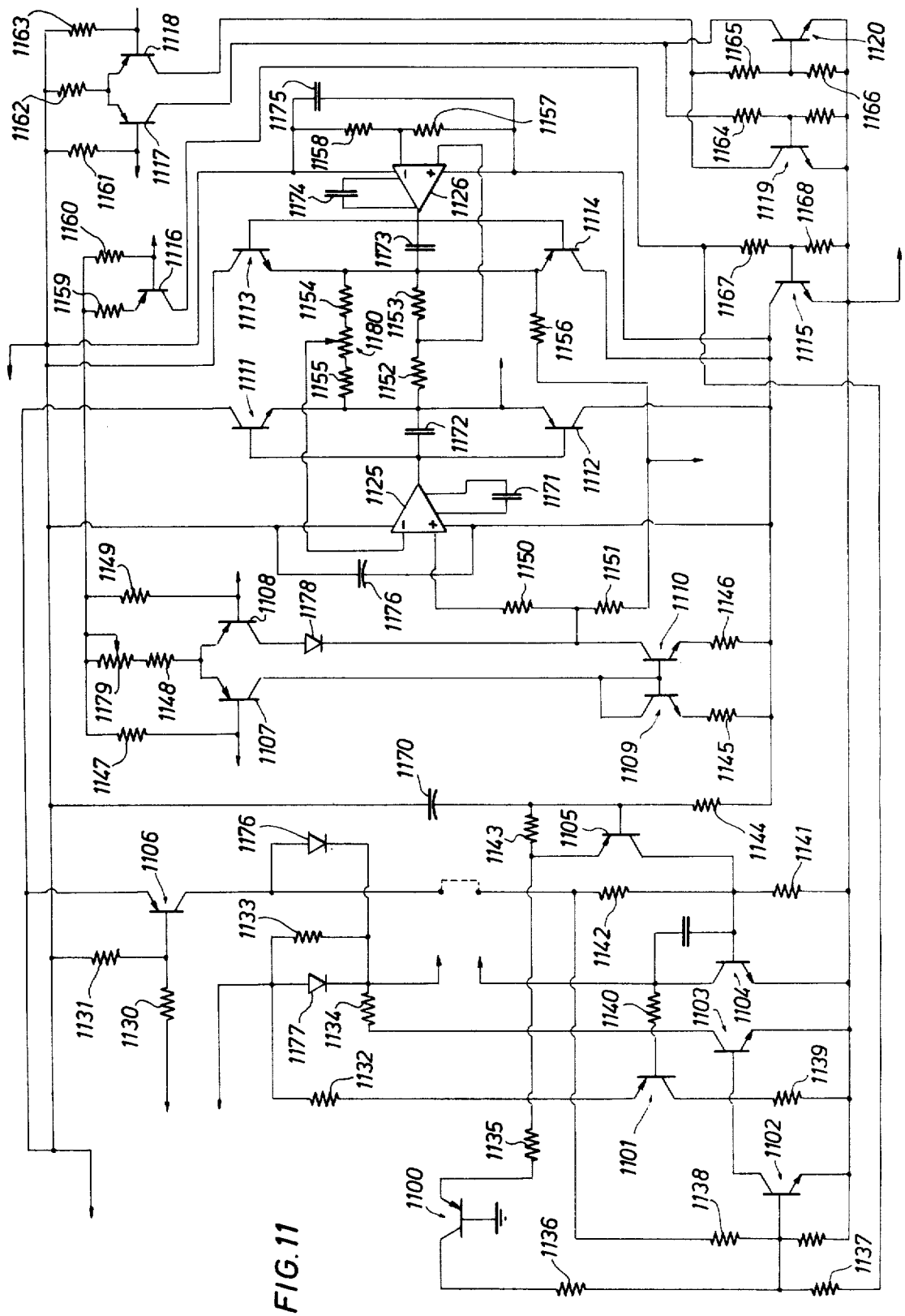
FIG. 11 is a schematic diagram of the deck-motion-control circuitry of the system of FIG. 2.

Referring now to FIG. 11, there is shown the schematic diagram of the deck motion control 106 which is utilized in the portable data entry apparatus of this invention. It is comprised of transistors 1100 through 1120, operational amplifiers 1125 and 1126, resistors 1131 through 1168, capacitors 1170 through 1176, diodes 1177 through 1178 and potentiometers 1179 and 1180 and is connected as shown. In the preferred embodiment of this invention the values and types of the components shown in FIG. 11 are:
 transistor 1100:MPS404A;
 transistor 1101:2N4125;
 transistor 1102:MPS5172;
 transistors 1103 and 1104:2N4410;
 transistor 1105:MPS404;
 transistor 1106:2N4403;
 transistors 1107 and 1108:2N4125;
 transistors 1109 and 1110:MPS5172;
 transistor 1111:MJE200;
 transistor 1112:MJE210;
 transistor 1113:MJE200;
 transistor 1114:MJE210;
 transistor 1115:MJE200;
 transistors 1116 and 1117 and 1118:2N4403;
 transistors 1119 and 1122:2N4401;

operational amplifiers 1125 and 1126:LM301 (National Semiconductor);
resistor 1130:1K;
resistor 1131:2.2K;
resistor 1132:1K;
resistor 1133:22;
resistor 1134:56;
resistor 1135:430;
resistor 1136:10K;
resistors 1137 through 1140:4.7K;
resistor 1141:1K;
resistor 1142:2.7K;
resistors 1143 through 1146:4.7K;
resistors 1147–1149:.2.K;
resistors 1150 and 1151:2K;
resistors 1152 and 1153:10K;
resistors 1154 and 1155:3.3K;
resistor 1156:22;
resistor 1157 and 1158:1oK;
resistor 1159:510;
resistor 1160:2.2K;
resistor 1161:2.2K;
resistor 1162:247K;
resistor 1163:2.2K;
resistor 1164 and 1165:82;
resistor 1167:1K;
resistor 1168:680;
capacitor 1170:1mfd;
capacitor 1171:33pfd
capacitor 1172:.1mfd
capacitor 1173;.1mfd;
capacitor 1174:33pfd;
capacitors 1175 and 1176:.47mfd; and
diodes 1176 through 1178:1N914.

Figure 12:
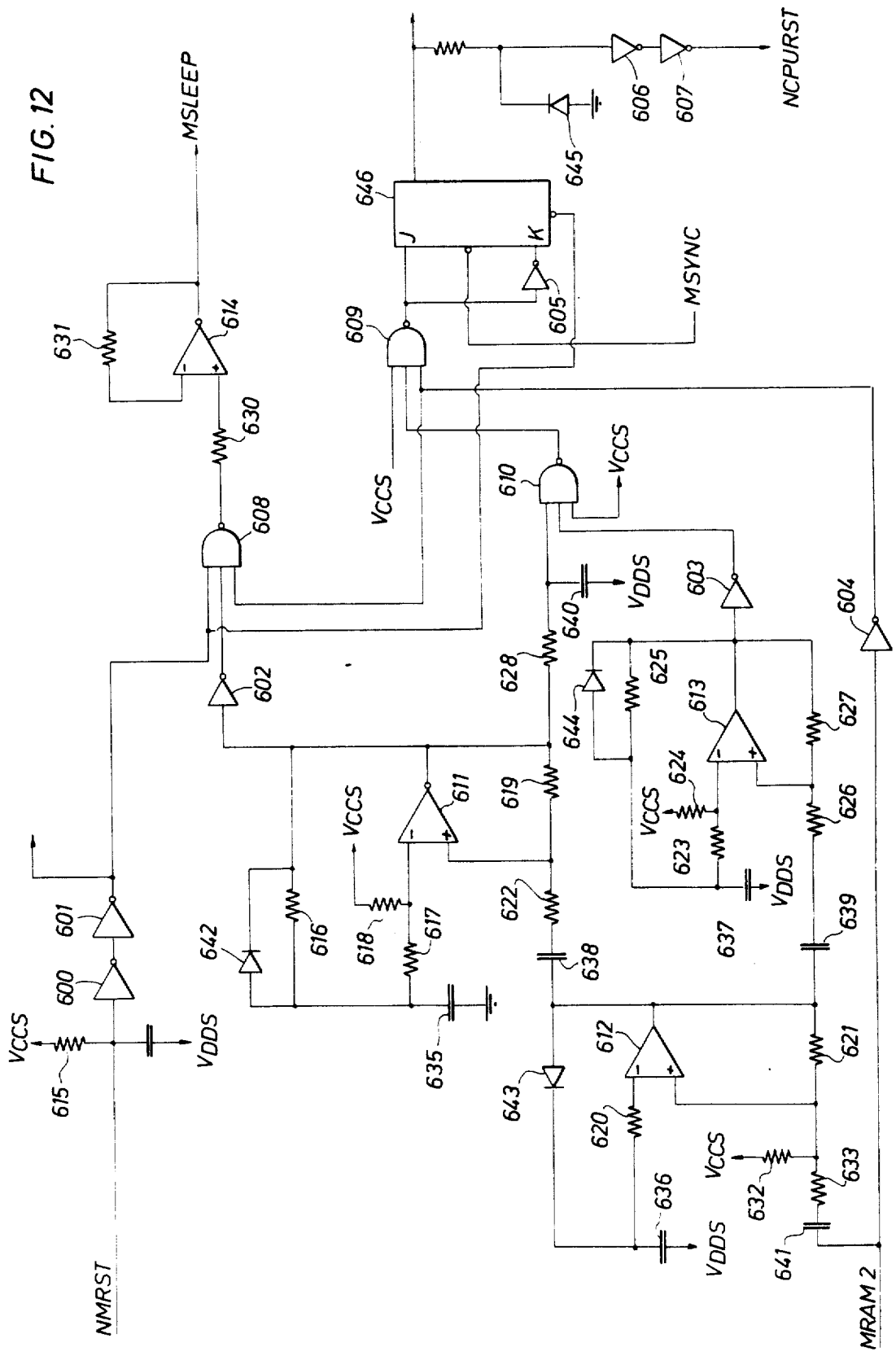
FIG. 12 is a schematic diagram of the alarm clock circuitry of the system of FIG. 2.

Referring now to FIG. 12, there is shown the schematic diagram of the alarm clock circuitry 117 of FIG. 2 which is utilized in the preferred embodiment of this invention. It is comprised of inverter elements 600 and 607, NAND gates 608 through 610, operational amplifiers 111 through 614, resistors 615 through 633, capacitors 634 through 641, diodes 642 through 645, and flip flop 646, all connected as shown. Alarm circuitry 117 receives inputs from microcomputer set 100 (FIG. 5), and generates the signal MSLEEP which is utilized to switch between the "awake" and "asleep" times.

In the preferred embodiment of this invention, the values and types of the components utilized are:
inverter element 600 through 605:74C04;
inverter elements 606 and 607:74L04;
NAND gates 608 through 610:74C10;
operational amplifiers 611 through 614:LM3900 (National Semiconductor Corp);
resistor 615:150K;
resistor 616, 617, 623, and 625:510K;
resistor 618:5.1M;
resistors 619 and 627:1.5M;
resistor 620:1M;
resistor 621, 630, 631, and 633:1M;
resistor 622:330K;
resistor 624;5.1M;
resistor 626:330K;
resistor 628:10K;
resistor 629:6.2K;
resistor 632:10M;
capacitor 634:.05mfd;
capacitor 635:.002mfd;
capacitor 637:750pfd;
capacitors 638 and 639:100pfd;
capacitor 640:.001mfd;
capacitor 641:100pfd;
diodes 642 through 645:1N914; and
flip flops 646:74C7.

Figure 13:
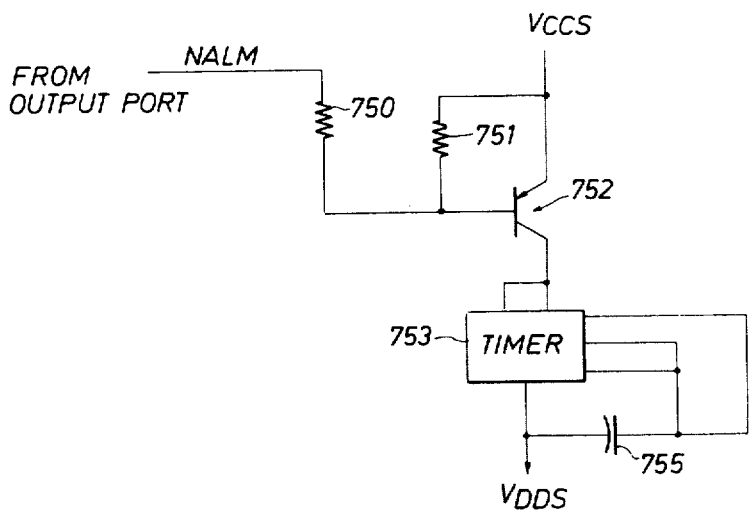
FIG. 13 is a schematic diagram of the alarm circuitry of the system of FIG. 2.

Referring now to FIG. 13, there is shown the alarm 112 which is utilized in the preferred embodiment of this invention. The signal NALM, from output port 105, when active signifies an alarm condition. This signal turns on transistor 752 which triggers timer 753. The output of timer 753 then drives speaker 754 for a time, and this speaker can be heard by the operator of the portable data entry apparatus.

In the preferred embodiment of this invention the values and types of the components of the alarm circuitry are:
resistors 750 and 751:2.7K;
transistor 752:2N125's;
timer 753:NE555N (Signetics Corp.); and
capacitor 755:1mfd.

It should be observed that while an NE555N is the preferred type of device for timer 753, any compatible monostable multivibrator may be used in place of it.

Figure 14:
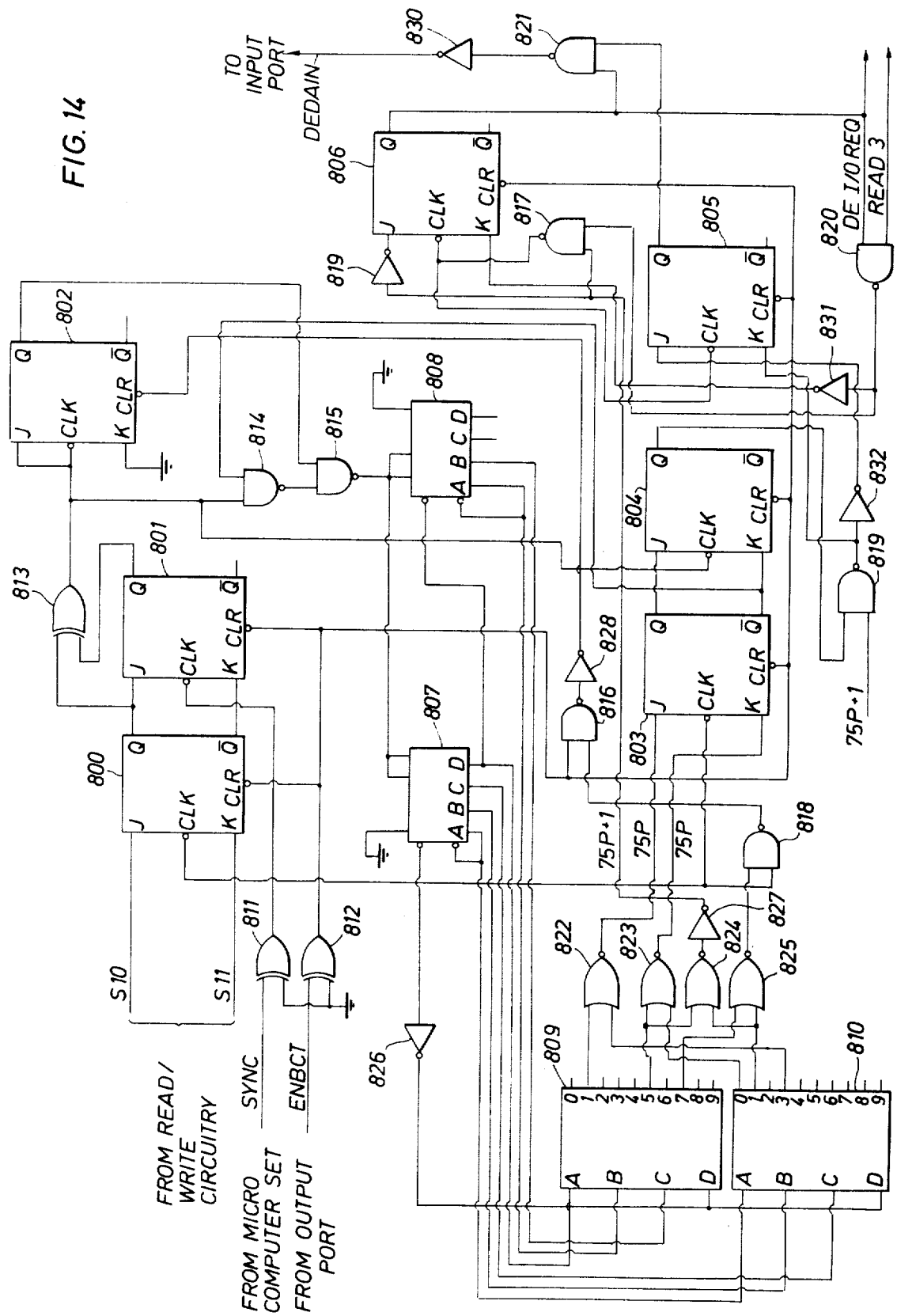
FIG. 14 is a schematic diagram of the bit cell timer circuitry of the system of FIG. 2.

Referring now to FIG. 14, there is shown bit cell timer 108 that is used in the preferred embodiment of this invention. It is comprised of flip flops 800 and 806, counters 807 and 808, decoders 809 and 810, exclusive OR gates 811 through 813, NAND gates 814 through 821, NOR gates 822 through 825, and inverter gates 826 through 830. The function of the bit cell timer is to determine the binary value of the information read from the magnetic tape.

In the preferred embodiment of this invention the various types of devices utilized are:
flip flops 800 through 806:74L73;
counters 807 and 808:74L93;
decoders 809 and 810:74L42;
exclusive OR gates 811 and 812:74L86;
NAND gates 814 through 821:74L00;
NOR gates 822 through 825:74L02; and
inverter elements 826 through 830:74L04.

While the foregoing schematic diagram illustrates the preferred exemplification of the bit cell timer, it should be evident to those skilled in the art of logic design that the above described circuitry could be implemented using a wide variety of devices as substitutes for those enumerated above. Any equivalents of the above enumerated circuitry should, therefore, be so construed.

Figure 15:
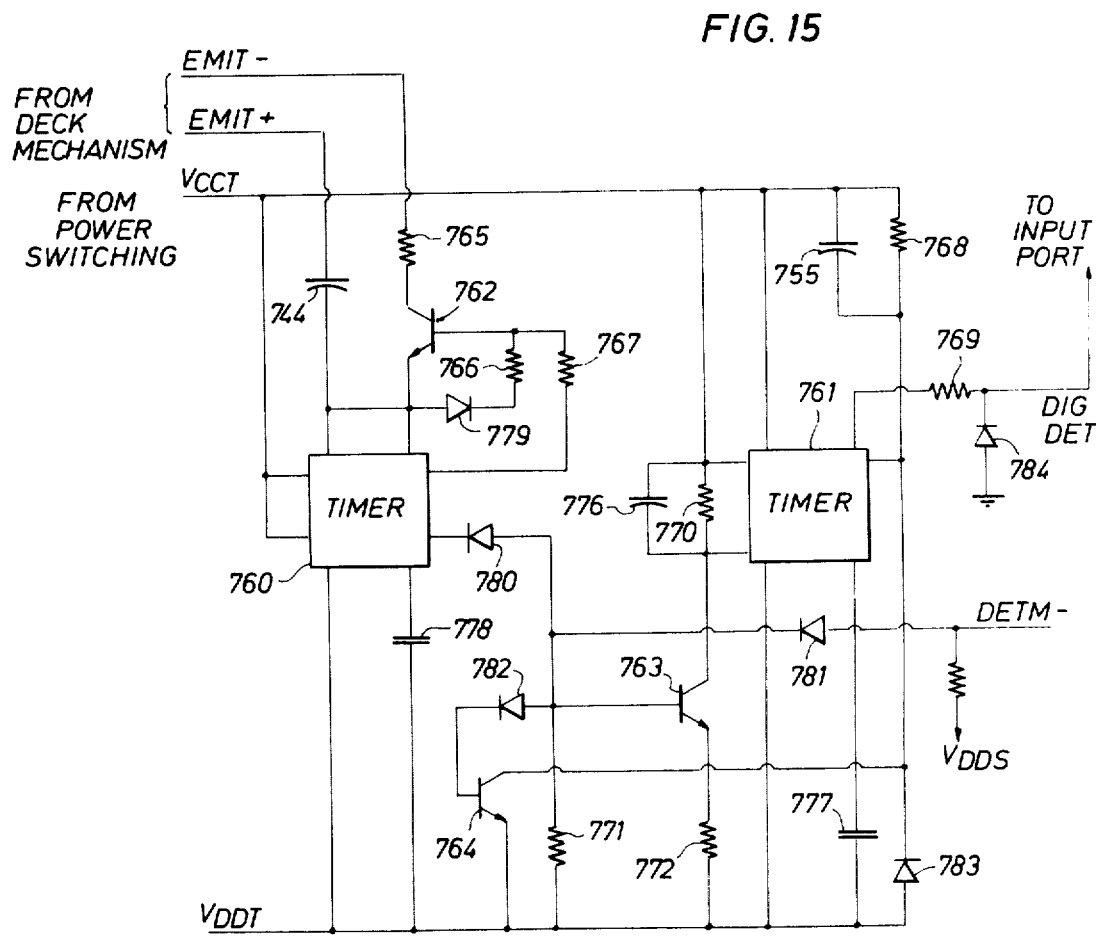
FIG. 15 is a schematic diagram of the emitter detector circuitry of the system of FIG. 2.

Referring now to FIG. 15, there is shown a schematic diagram of the emitter detector 118 used in the portable data entry apparatus of this invention. The function of the emitter detector circuitry is to detect the presence of information upon the tape and to give an indication to the mirocomputer set 100 via the input port circuitry when the digit is detected. The emitter detector circuitry is comprised of timers 760 and 761, transistors 762–764, resistors 765–773, capacitors 774–778, and diodes 779–784. The values and types of components utilized are:
timers 760 and 761:NE555N (Signetics Corp.);
transistor 762:MJE200;
transistors 763 and 764:NPS5172;
resistor 765:812;
resistor 766:1K;
resistor 767:470;
resistor 768:200K;
resistor 769:47K;
resistor 770:3M;
resistor 771:20K;

resistor 772:470;
resistor 773:150K;
capacitors 774 and 775:.47mfd;
capacitor 776:.002mfd;
capacitors 777 and 778:.01mfd; and
diodes 779 through 784:1N914.

Figure 16:
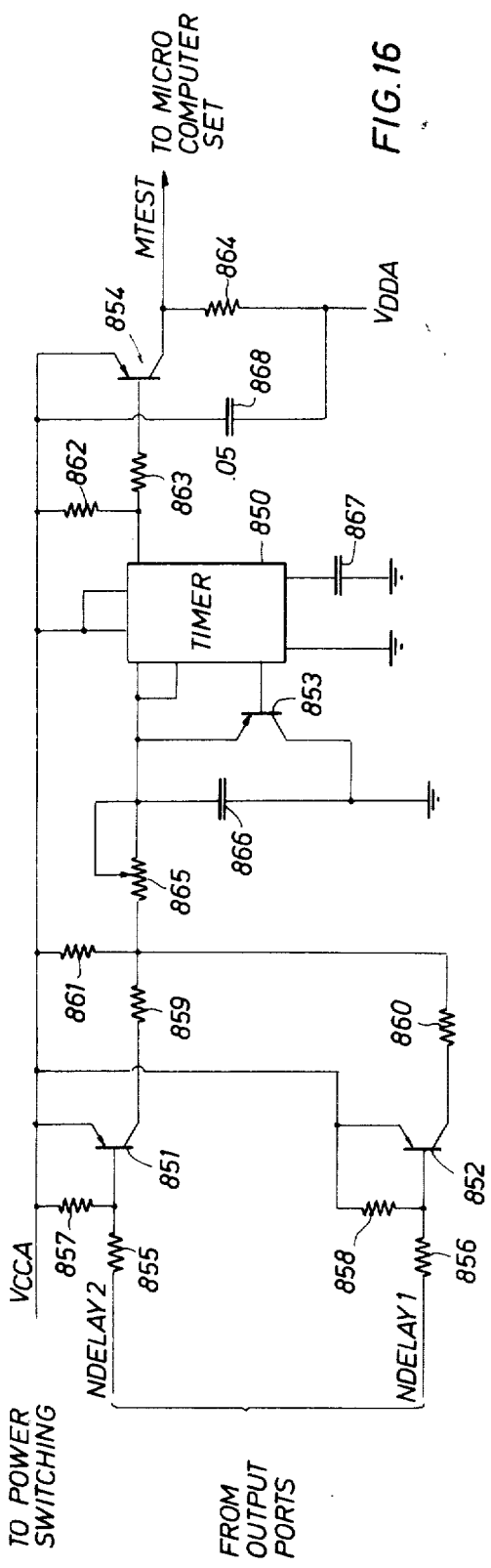
FIG. 16 is a schematic diagram of the delay circuitry of the system of FIG. 2.

Referring now to FIG. 16, there is shown the detailed schematic diagram of the delay 113 circuitry which is utilized in the portable data entry apparatus of this invention. It is comprised of timer 850, transistors 815 through 854, resistors 855 through 864, potentiometer 865, and capacitors 866 through 868.

In the preferred embodiment of this invention the values and types of the components utilized in the delay circuitry of this invention are:
  timer 850:NE555N (Signetics Corp.);
  transistors 851, 852, and 854:MPS3702;
  transistor 852:2N4125;
  resistors 855, 856, and 863:1K;
  resistors 857, 858, 862, and 864:4.7K;
  resistor 859:30K;
  resistor 860:10K;
  resistor 861:1M;
  potentiometer 865:20K (Maximum resistance);
  capacitor 866:.47mfd;
  capacitor 867:.01mfd; and
  capacitor 868:.05mfd.

Figure 17:
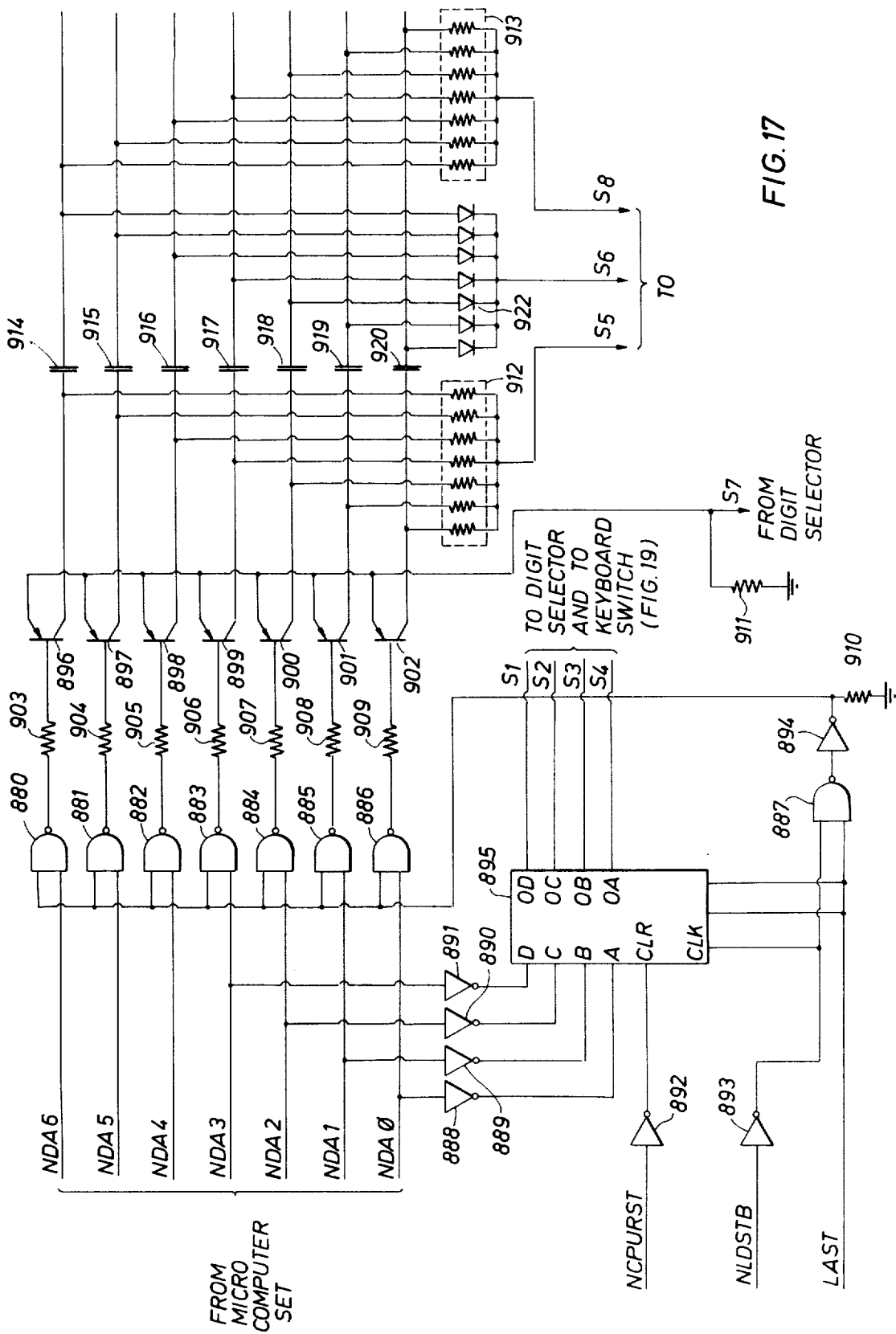
FIG. 17 is a schematic diagram of the segment selector circuitry of the system of FIG. 2.

Referring now to FIG. 17, there is shown the segment selector 119 that is utilized to select the appropriate segment or segments of the display 109 of FIG. 2, to be displayed. The circuitry is comprised of NAND gates 880 through 887, inverting elements 888 through 894, storage device 895, transistors 896 through 902, resistors 903 through 911, resistor packages 912 and 913, capacitors 914 through 920, and diodes 922 and is connected as shown.

During the period of time that inverter 894 is a logical one, NAND gates 880 through 886 are enabled and a logical one present on any of the input lines NDA0-NDA6 from the microcomputer set will cause the respective transistors 896 through 902 to be forward biased, and voltage $v_{ccs}$ will be present at the collector of any forward biased transistor. The collectors of transistors 896 through 902 are connected directly to the segment inputs of display 109 (FIG. 2).

During the period of time that the pulse NLDSTB is active, signals NDAφ through NDA3 are loaded into storage device 895 and appear at the outputs of storage device 895. These outputs are decoded by both the digit selector 120 and the keyboard switch and interrogation assembly 121.

Referring still to FIG. 17, the values and types of the components in the preferred embodiment of this invention are:
  NAND gates 880 through 887:74L00;
  inverting elements 888 through 891, 893, and 894:74L04;
  inverting element 892:74C04;
  storage device 895:DM85L51 (National Semiconductor Corp.);
  transistors 896 through 902:2N6223;
  resistors 903 through 909:1K;
  resistor 911:10K;
  resistor package 912:A54504:02 (manufacturer is?);
  resistor package 913:A54505-03;
  capacitors 914 through 920:.001mfd (1KV, 10%); and
  diodes 922:1N914.

Figure 18:
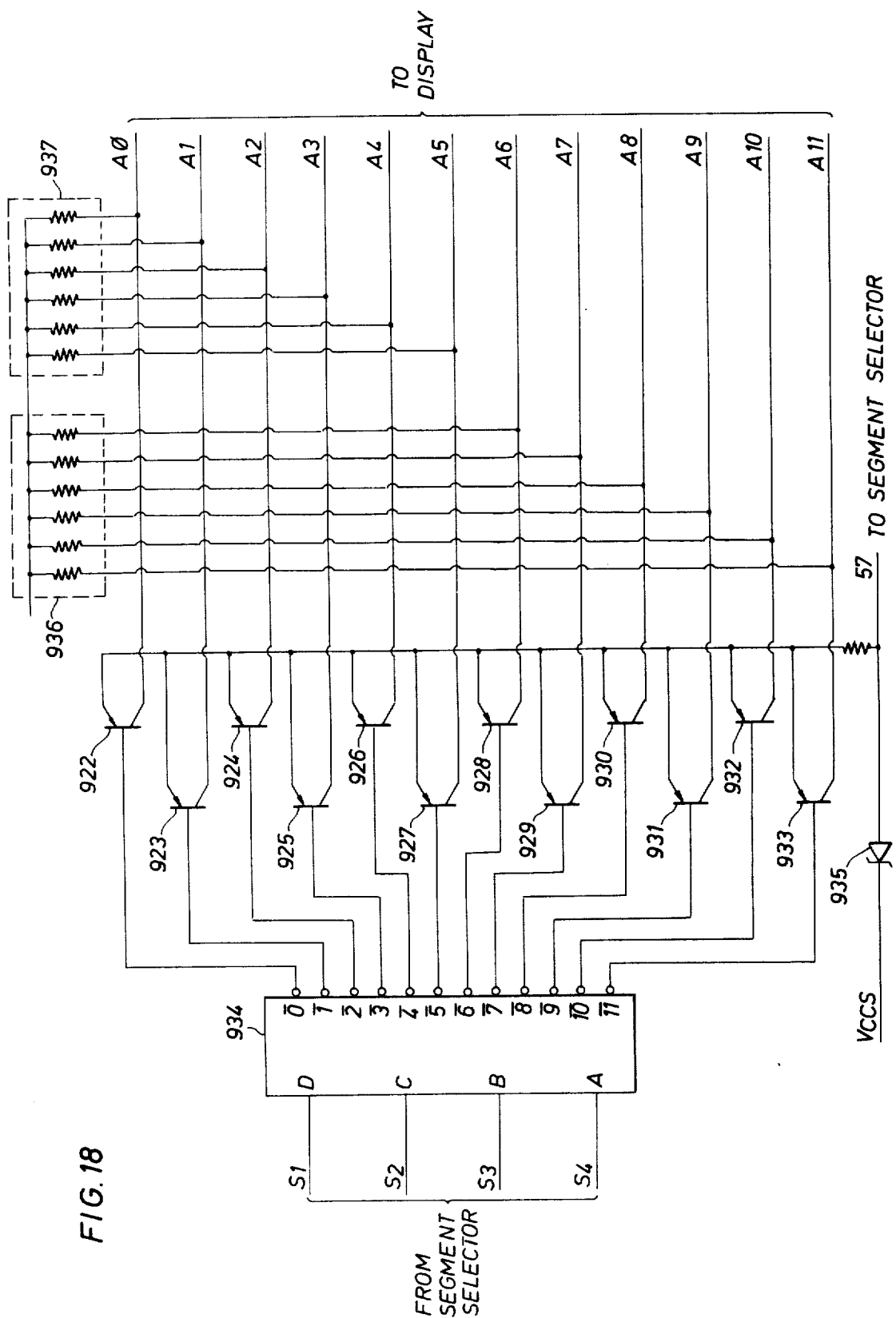
FIG. 18 is a schematic diagram of the digit selector circuitry of the system of FIG. 2.

Referring now to FIG. 18, there is shown the digit selector 120 that is utilized in a preferred embodiment of the portable data entry apparatus of this invention. It is comprised of transistors 922 through 933, decoder 934, zener diode 935, and resistor packages 936 and 937 and is connected as shown.

The binary value of inputs S1-S4 is decoded by decoder 934. When decoding occurs, one and only one of the outputs of the decoder 934 will be active, thereby providing a forward bias for one and only one of the transistors 922 through 933. The collectors of transistors 922 through 933 are connected to the digit inputs of display 109 (FIG. 2) and are used by display to select the proper digit which is to be displayed.

In the preferred embodiment of this invention the values and types of the components utilized are:
  decoder 934:DM74L154AN (National Semiconductor);
  transistor 922 through 933:2N6223;
  zener diodes 935:1N746; and
  resistor packages 936 and 937:AS4504-04-330K Referring now to FIG. 19, there is shown the schematic representaion of the keyboard switch and interrogation assembly 121 that is utilized in a preferred embodiment of this invention. It is comprised of decoder 938, inverting elements 939 through 942, keyboard input switch unit 943, and diodes 944 and is connected as shown.

Periodically inputs S1-S4 from the segment selector will be activated. During the activation, binary values of 0-9 will be assumed by the four inputs. If one of the switches from keyboard input switch unit 943 have been depressed, that fact will be detected during the scan of binary values 0 to binary value 4. Outputs KERO0-KERO3 will be active and this value will be read by the microcomputer set 100 through the input ports.

The values and types of the components utilized in FIG. 19 are:
  decoder 938:DM74L42AN (National Semiconductor Corp.);
  inverters 939 through 942:74L04;
  keyboard input switch 943:
  diodes 944:1N14; and
  resistors 945:10K.

Figure 20:
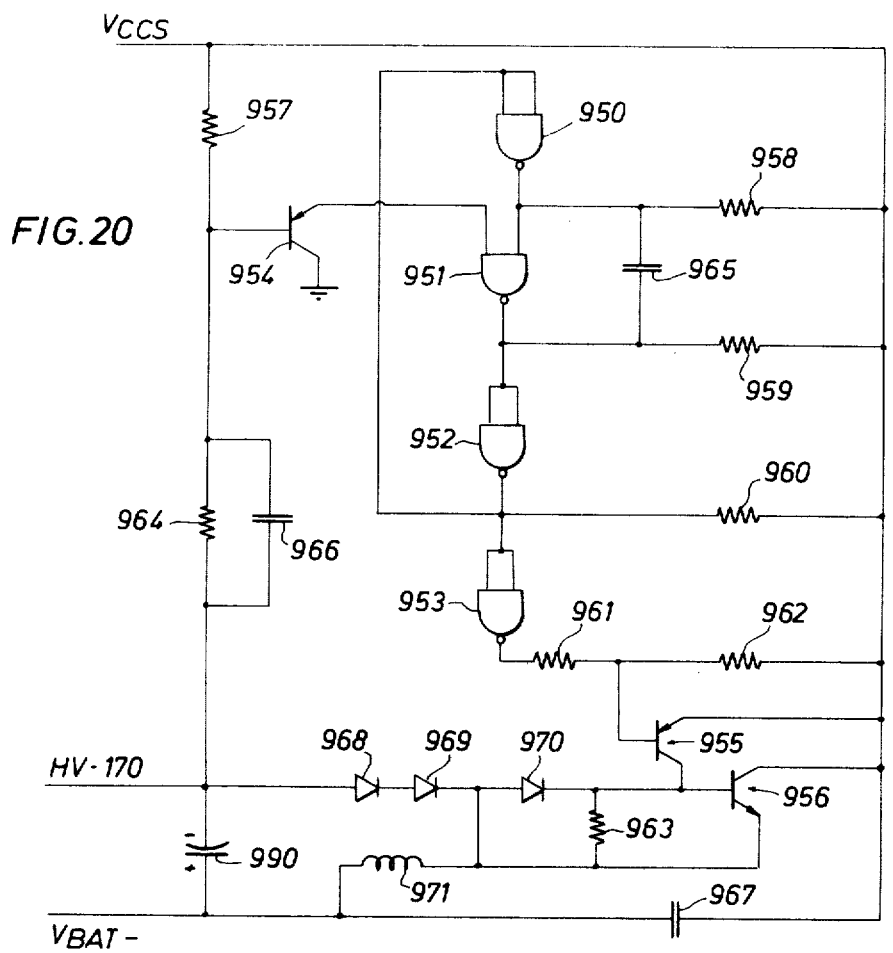
FIG. 20 is a schematic diagram of the high voltage power supply of the system of FIG. 2.

Referring now to FIG. 20, there is shown the high voltage power supply 110 of FIG. 2 which is utilized in the preferred embodiment of this invention. It is comprised of NAND gates 950 through 953, transistors 954 through 956, resistors 957 through 964, capacitors 965 through 967, diodes 968 through 970, inductor 971, and capacitor 990, all connected as shown. The function of this circuitry is to convert the battery voltage to a high voltage which can be utilized by a display of the gas discharge or plasma type such as display 109 of FIG. 2. Power supply 110 functions, therefore, as a power converter.

Figure 20A:
FIG. 20a graphically shows the output waveform of one component of the high voltage power supply of FIG. 20.
Figure 20B:
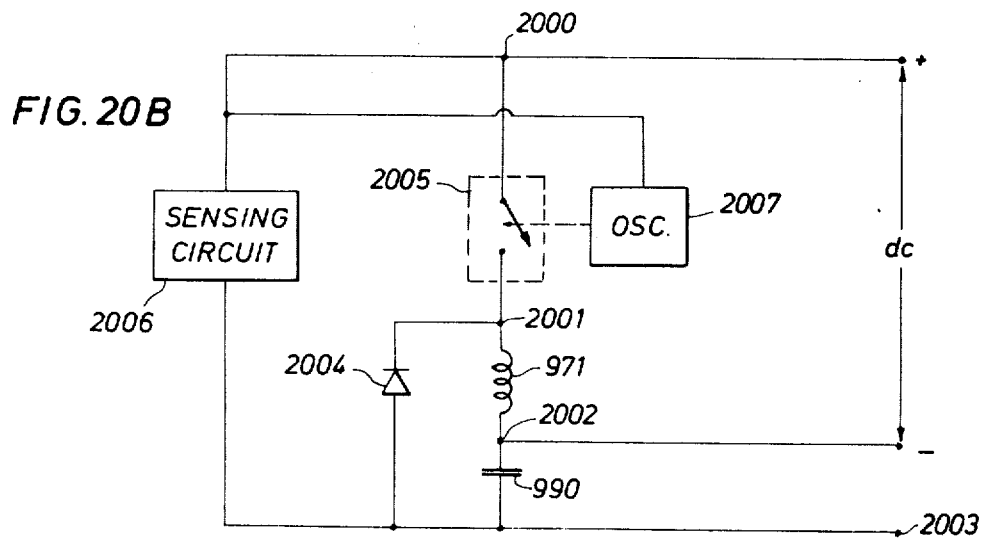
FIG. 20b is a simplified schematic diagram of the high voltage power supply of FIG. 20.

FIG. 20b is a simplified schematic diagram of the high voltage supply 110 which is shown in FIG. 20. It is basically a four terminal device which has four output contact points 2000, 2001, 2002, and 2003. A d-c voltage source is connected between the first contact point 2000 and the third contact point 2002. Inductor 971 is connected between second contact point 2001 and third contact point 2002. Capacitor 990 is connected between third contact point 2002 and fourth (output) contact point 2003. A diode 2004 is connected between second contact point 2001 and fourth (output) point 2003, with the cathode of diode 2004 connected to second contact point 2001. A switch 2005 is connected between first contact point 2000 and second contact point 2001. The switch 2005 of FIG. 20b is comprised of transistors 955 and 956 of FIG. 20. Oscillator 2007 periodically closes switch 2005, and it is comprised of NAND gates 950 through 953, resistors 958 through 961, and capacitor 965 in FIG. 20. The sensing circuit 2006 is connected between fourth (output) contact point 2003 and oscillator 2007.

When D-C power is supplied to the portable data entry apparatus, oscillator 2007 periodically closes the switch 2005 ("on" time — FIG. 20a), and energy storage begins in inductor 971. When switch 2005 is open ("off" time — FIG. 20a), current flows through the loop comprised of inductor 971, capacitor 990, and diode 2004. Diode 2004 operates, therefore, as a free wheeling or flyback diode. In the preferred embodiment of this invention, the duty cycle of the output of the oscillator 2007, i.e., the ratio of the "off" time to the "on" time shown in FIG. 20b, is equal to the ratio of the input voltage to the output voltage and is adjusted for efficiency. During the time switch 2005 is open, current is extracted from capacitor 990 by inductor 971. The voltage at fourth (output) contact 2003 begins to increase negatively during openings of switch 2005. If this voltage were not controlled, it would approach −400 volts in value.

Sensing circuit 2006 operates as a control device for the volage at the fourth (output) contact point 2003 and prevents the voltage at that point from significantly going more negatively than −170 volts. Sensing circuit 2006 is comprised of resistors 957 and 964, capacitor 966, and transistor 954 in FIG. 20. When the signal at fourth (output) contact point 2003 reaches approximately −170 volts, sensing circuit 2006 detects this voltage. It then inhibits oscillator 2007 from making further closures of switch 2005 until the output voltage HV-170 becomes sufficiently more positive than −170 volts. Sensing circuit 2006 detects this rise in output voltage and enables oscillator 2007. Sensing circuit 2006 functions, therefore, to stop power conversions by the power supply 110 when the output voltage is significantly more negative than −170 volts and to permit power conversion when the output voltage is significantly more positive than −170 volts. The signal HV-170 (FIG. 20) is presented to display unit 109 (FIG. 2), and it is the voltage that is used to activate display 109 when a character is to be displayed.

The various types and values of the components in the preferred embodiment of FIG. 20 are:
NAND gates 950 through 953:74L03;
transistor 954:2N4125;
transistor 955:MPSA92;
transistor 956:NPSA42;
resistor 957:270K;
resistor 958:2K;
resistors 959 and 960:20K
resistor 961:2.2K;
resistor 962:680;
resistor 963:68;
resistor 964:10M;
capacitor 965:.01mfd;
capacitor 966:150pfd;
resistor 967:.47mfd;
diodes 968-970:1N914;
inductor 971:5 millihenrys; and
capacitor 990:.1mfd (200v).

Figure 21:
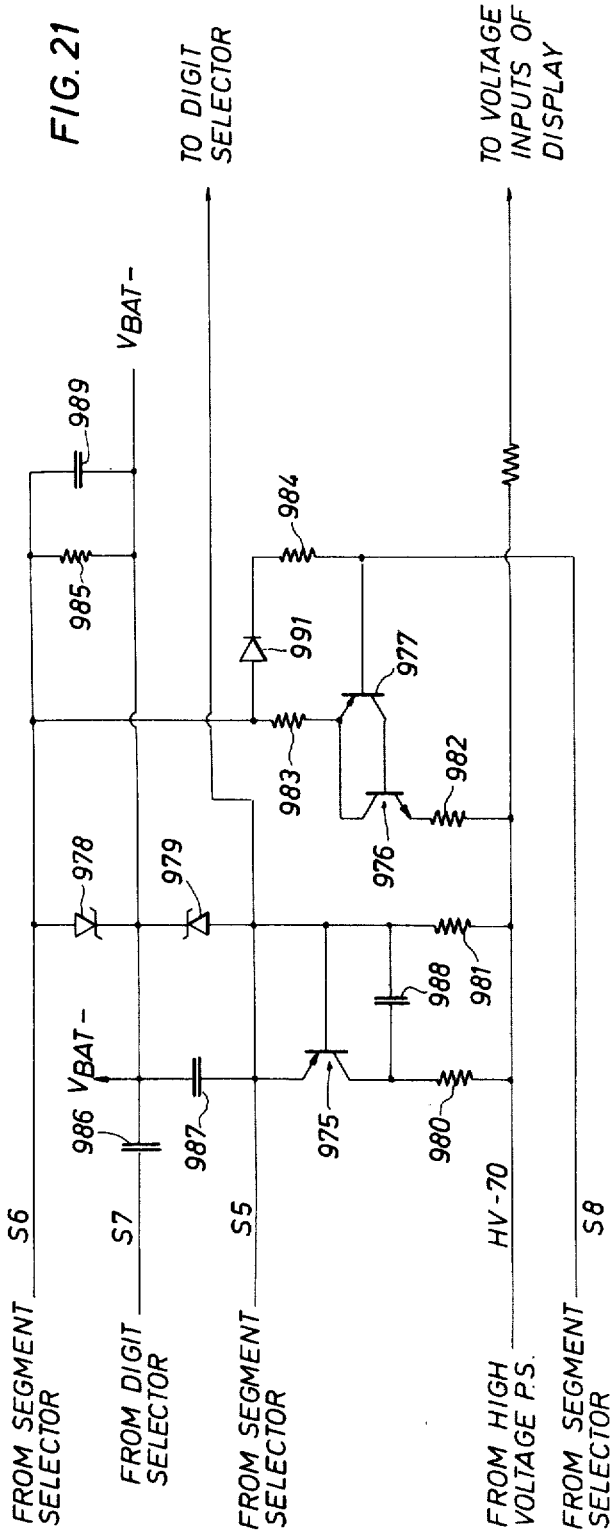
FIG. 21 is a schematic diagram of the power saving circuitry that is used in conjunction with the high voltage power supply of FIG. 20.

Referring now to FIG. 21, there is shown the circuitry that is utilized in conjunction with the high voltage power supply 110 in the preferred embodiment of this invention. It is comprised of transistors 975 through 977, zener diodes 978 and 979, capacitors 986 through 989, and diode 991, all connected as shown.

The function of the power-saving circuitry of FIG. 21 is to maintain appropriate voltages on display 109 for optimum display performance.

The values and types of the components of the powersaving circuitry of FIG. 21 are:
transistors 975 and 977:2N4888;
transistor 976:MPSA42;
zener diode 978:1N5275;
zener diode 979:1N5257;
resistor 980:39K;
resistor 981:3.9M;
resistor 982:2K;
resistor 983:1K;
resistor 984:20K;
resistor 985:10M;
capacitor 986:.47mfd;
capacitor 987:1mfd (WDCV=50v);
capacitor 988:150pfd (WDCV=1000);
capacitors 989:.1mfd (WDCV=200); and
diode 991:1N914.

Figure 22:
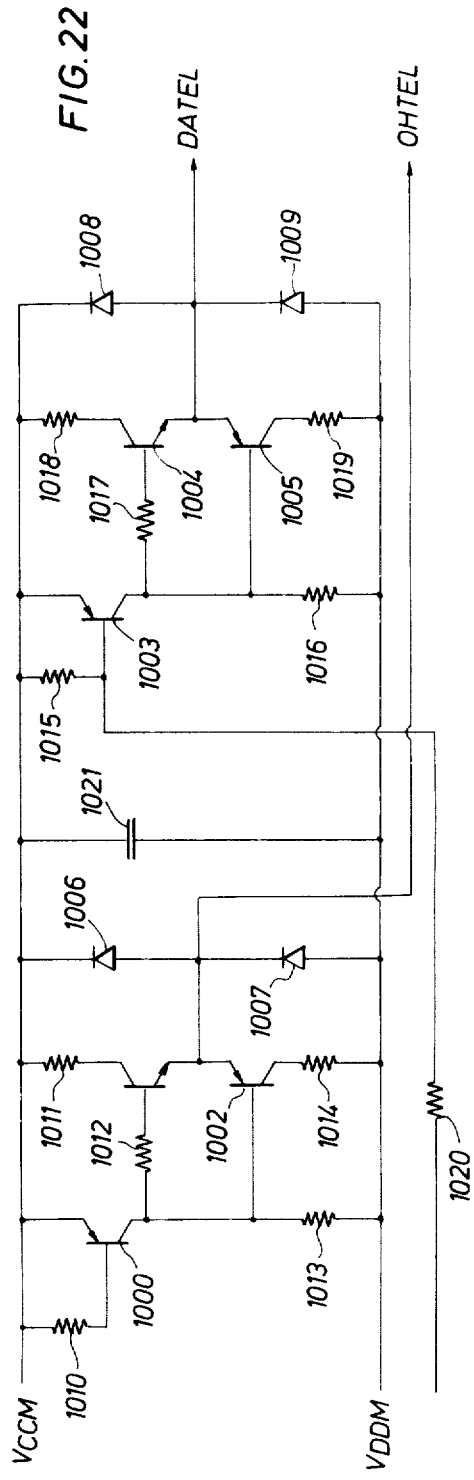
FIG. 22 is a schematic diagram of a portion of the modem circuitry of the system of FIG. 2.

Referring now to FIG. 22, there is shown a portion of the modem circuitry that is utilized in the portable data entry apparatus of this invention. It is comprised of transistors 1000 through 1005, diodes 1006 through 1009, resistors 1010 through 1020, and capacitor 1021. This circuitry is utilized to interface with a Data Access Arrangement.

The values and types of the components utilized in this portion of the modem circuitry are:
transistors 1000, 1002, 1003 and 1005:MPS3702;
transistors 1001 and 1004:MPS5172;
diodes 1006 through 1009:1N914;
resistors 1010, 1013, 1016, and 1020:4.7K;
resistors 1011 and 1018:62;
resistors 1012 and 1017:1K;
resistors 1014 and 1019:220; and
capacitor 1021:.04mfd.

Figure 23:
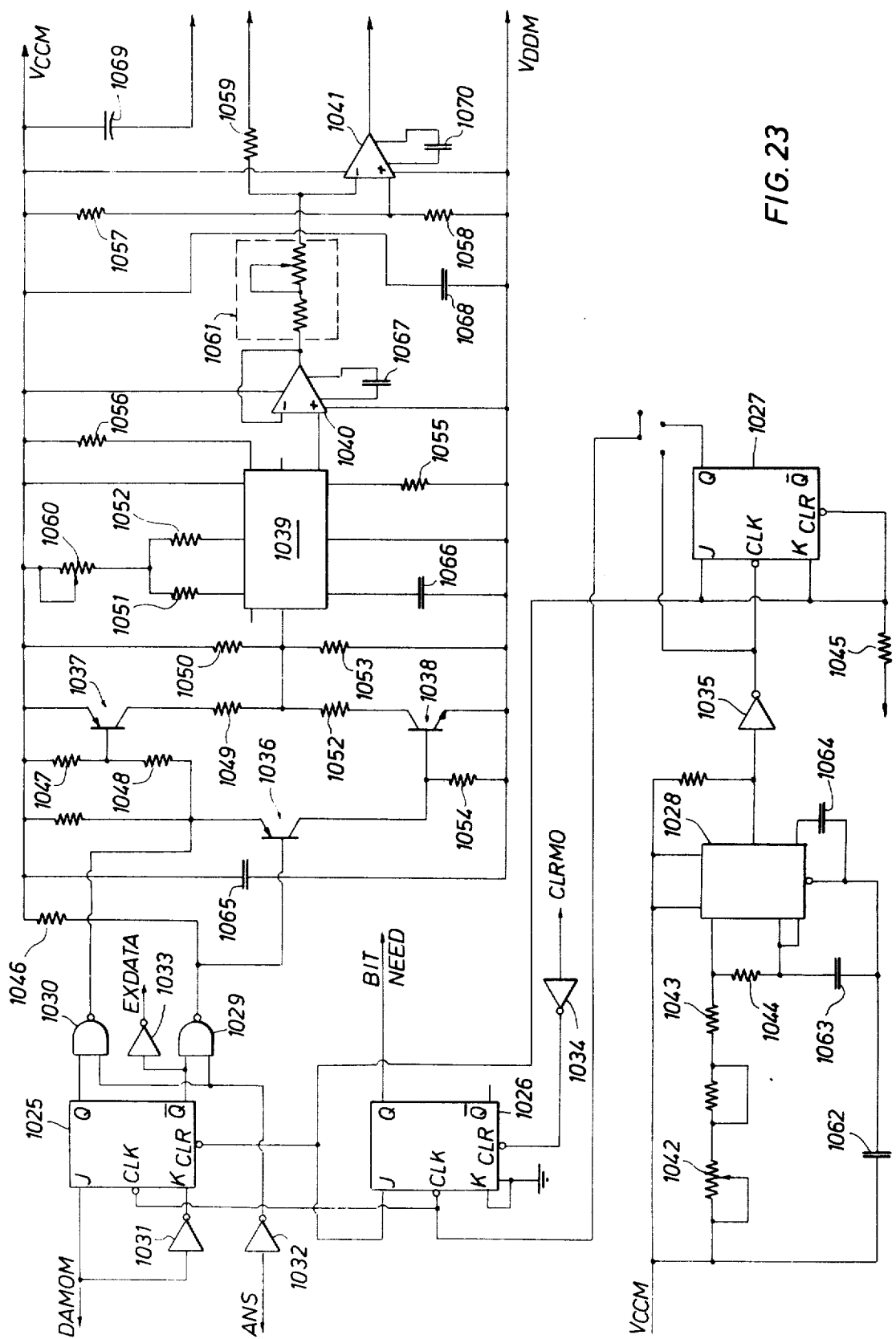
FIG. 23 is a schematic diagram of the portion of the modem circuitry of the system of FIG. 2 which interfaces an acoustical coupler.

Referring now to FIG. 23, there is shown another portion of the modem circuitry that it utilized in the preferred embodiment of this invention. It is comprised of flip flops 1025 through 1027, timer 1028 NAND gates 1029 and 1030, inverter elements 1031 through 1035, transistors 1036 through 1038, voltage controlled oscillator 1039, operational amplifiers 1040 and 1041, potentiometers 1042, 1060, and 1061, capacitors 1062 through 1070, and resistors 1043 through 1059, all of which are connected as shown in the Figure.

The values and types of the components utilized in this portion of the modem circuitry are:
flip flops 1025 through 1027:74L73;
timer 1028:NE555 (Signetics Corp);
NAND gates 1029 and 1030:74L00;
inverter elements 1031 through 1035:74L04;
transistor 1036:2N4125;
transistor 1037:MPS404;
transistor 1038:MPS3707;
voltage controlled oscillator 1039:8038EC (Intersil Corp);
operational amplifiers 1040 and 1041:LM301 (National Semiconductor Corp.);
potentiometer 1042:20K (maximum resistance);

resistor 1043:220K;
resistor 1044:15K;
resistor 1045:22K;
resistor 1046:1K;
resistor 1047:1K;
resistor 1048:30K;
resistor 1049:3.92K (1% metal film);
resistor 1050:3.74K (1% metal film);
resistor 1052:26.7K (1% metal film);
resistor 1052:127.0K (1% metal film);
resistor 1053:14.7K (1% metal film);
resistor 1054:1K;
resistor 1055:82K;
resistor 1056:27K;
resistors 1057 and 1058:1K;
resistors 1059:510;
potentiometer 1060:4002-P-1-402 (4K maximum rating);
potentiometer 1061:4002-P-163 (maximum rating 8K);
capacitor 1062:.05mfd;
capacitor 1063:4700pfd;
capacitor 1064:.01mfd;
capacitor 1065;.05mfd;
capacitor 1066;4700pfd;
capacitors 1067 and 1070:100pfd;
capacitors 1068:.05mfd; and
capacitor 1069:200mfd.

What is claimed is:

1. A power supply comprising:
   a. first, second, third and output contact points;
   b. a d-c voltage source connected between the first and third points;
   c. an inductance connected between the second and third points;
   d. a capacitor connected between the third and output points;
   e. a diode connected between the second and output points, for providing a current conduction path through the inductance and the capacitor;
   f. a switch connected between the first and second points,
   g. an oscillator for periodically closing said switch, said oscillator having a predetermined period and duty cycle; and
   h. a sensing circuit connected between the first and output points, for inhibiting the oscillator when the voltage at the output point exceeds a predetermined value.

2. The power supply of claim 1 wherein said switch includes at least one transistor.

* * * * *